(12) United States Patent
McClusky

(10) Patent No.: US 7,048,545 B2
(45) Date of Patent: May 23, 2006

(54) NMR TEACHING METHOD AND APPARATUS

(75) Inventor: John V. McClusky, Seguin, TX (US)

(73) Assignee: Texas Lutheran University, Seguin, TX (US)

( * ) Notice: Subject to any disclaimer, the term of this patent is extended or adjusted under 35 U.S.C. 154(b) by 136 days.

(21) Appl. No.: 10/965,136

(22) Filed: Oct. 14, 2004

(65) Prior Publication Data

US 2005/0089832 A1    Apr. 28, 2005

Related U.S. Application Data

(63) Continuation-in-part of application No. 10/625,358, filed on Jul. 23, 2003.

(51) Int. Cl.
*G09B 23/26* (2006.01)

(52) U.S. Cl. .................................... 434/278

(58) Field of Classification Search ............ 434/276, 434/277, 278, 280, 298
See application file for complete search history.

(56) References Cited

U.S. PATENT DOCUMENTS

| | | |
|---|---|---|
| 1,472,536 A | 10/1923 | Thomson |
| 2,140,103 A | 12/1938 | Bryan |
| 3,080,662 A | 3/1963 | Brumlik |
| 3,508,652 A | 4/1970 | Woolley |
| 3,510,962 A | 5/1970 | Sato |
| 3,626,604 A | 12/1971 | Pierce |
| 3,804,417 A | 4/1974 | Dawson |
| 3,854,223 A | 12/1974 | Dingman |
| 3,939,581 A | 2/1976 | Clarke, Jr. |
| 4,030,209 A | 6/1977 | Dreiding |
| 4,184,271 A | 1/1980 | Barnett, Jr. |
| 4,325,698 A | 4/1982 | Darling et al. |

(Continued)

OTHER PUBLICATIONS

A.M. Ingham; R.C. Henson; Intrepreting Infrared and Nuclear Magnetic Resonance Spectra of Simple Organic Compounds for the Beginner; J. Chem. Educ 1984, 61, 704.

(Continued)

*Primary Examiner*—Kurt Fernstrom
(74) *Attorney, Agent, or Firm*—Michelle Evans; Gunn & Lee, P.C.

(57) ABSTRACT

An NMR teaching method and apparatus incorporating pieces representative of chemical fragments. Each piece has the number of sides corresponding to the number of bonds present around the central atom. Bonds to hydrogen are curved while bonding sides are flat. The presence of concavities and convex tabs on the bonding sides indicates bonding of the respective piece to a mating piece that causes splitting of the NMR peak. The shape of concavities on each piece is indicative of the chemical fragment of the respective piece while the shape of the convex tab of the respective piece is indicative of the chemical fragment of the mating piece. First and second bonding indicators can be used to replace the convex tabs. When presented with a spectrum, a student user can select the necessary pieces using data from the spectrum. Once selected, the student user can then assemble the pieces to determine the identity of the unknown molecule in the NMR spectrum.

53 Claims, 15 Drawing Sheets

U.S. PATENT DOCUMENTS

| | | |
|---|---|---|
| 4,348,190 A | 9/1982 | Barrett |
| 4,398,888 A | 8/1983 | Darling et al. |
| 4,416,635 A | 11/1983 | Smith |
| 4,622,014 A | 11/1986 | Mikelsaar |
| 4,702,702 A | 10/1987 | Mikelsaar |
| 4,812,128 A | 3/1989 | Mikelsaar |
| 4,855,931 A | 8/1989 | Saunders |
| 4,877,406 A | 10/1989 | Wilk |
| 5,030,103 A | 7/1991 | Buist et al. |
| 5,846,088 A | 12/1998 | Reichert |
| 5,921,781 A | 7/1999 | Shaw |

OTHER PUBLICATIONS

R.D. Draper; B.R. Penfold; Nuclear Magnetic Resonance Interpretation with Graphics; J.Chem. Educ. 1984, 61,789.

Keith G. Calkins; Richard F. Daley; Computer Assisted Analysis of Nuclear Magnetic Resonance Spectra; J. Chem. Educ. 1989, 66,52.

Yoichi Habata; Sadatoshi Akabori; Teaching 1H NMR Spectrometry Using Computer Modeling; Jan. 2001, vol. 78 No. 1, p. 121.

N. Bampos; Understanding NMR Multiplet Structure with WinDMR; Jan. 2000, vol. 77 No. 1, p. 130.

Peter Lundberg; Educational NMR Software; J. Chem. Educ. 1997, 74, 1489.

Dianne A. Thoben; Thomas H. Lowry; An Analogy to Assist Understanding of Splitting Patterns in NMR Spectra; Jan. 1997, vol. 74 No. 1, p. 68.

Brian E. Mann; The Analysis of First-Order Coupling Patterns in NMR Spectra; J. Chem. Educ. 1995, 72, 614.

I. Ganjian; R.L. Baumgarten; R.J. Valenzuela; Using Spin-Spin Decoupling NMR for Structure Elucidation in the Extraction of Cinnamaldehyde; J.Chem.Educ. 1992,69,511.

Erin L. Anderson; Du Li; Noel L. Owen; Solving Molecular Structures Using NMR and Molecular Mechanics; J.Chem. Educ. 1992, 69, 846.

T. Viswanathan; F. Watson; D.T.C. Yang; Undergraduate Organic and Polymer Lab Experiments that Exemplify Structure Determination by NMR; J.Chem.Educ. 1991, 68,685.

John P. Chesick; Fourier Analysis and Structure Determination. Part II. Pulse NMR and NMR Imaging; J. Chem. Educ. 1989, 66-283.

Robert Badger, Josph Lesniak, Stephen Rutta; NMR Simulation and Interactive Drill/Interpretation; Journal of Chemical Education.

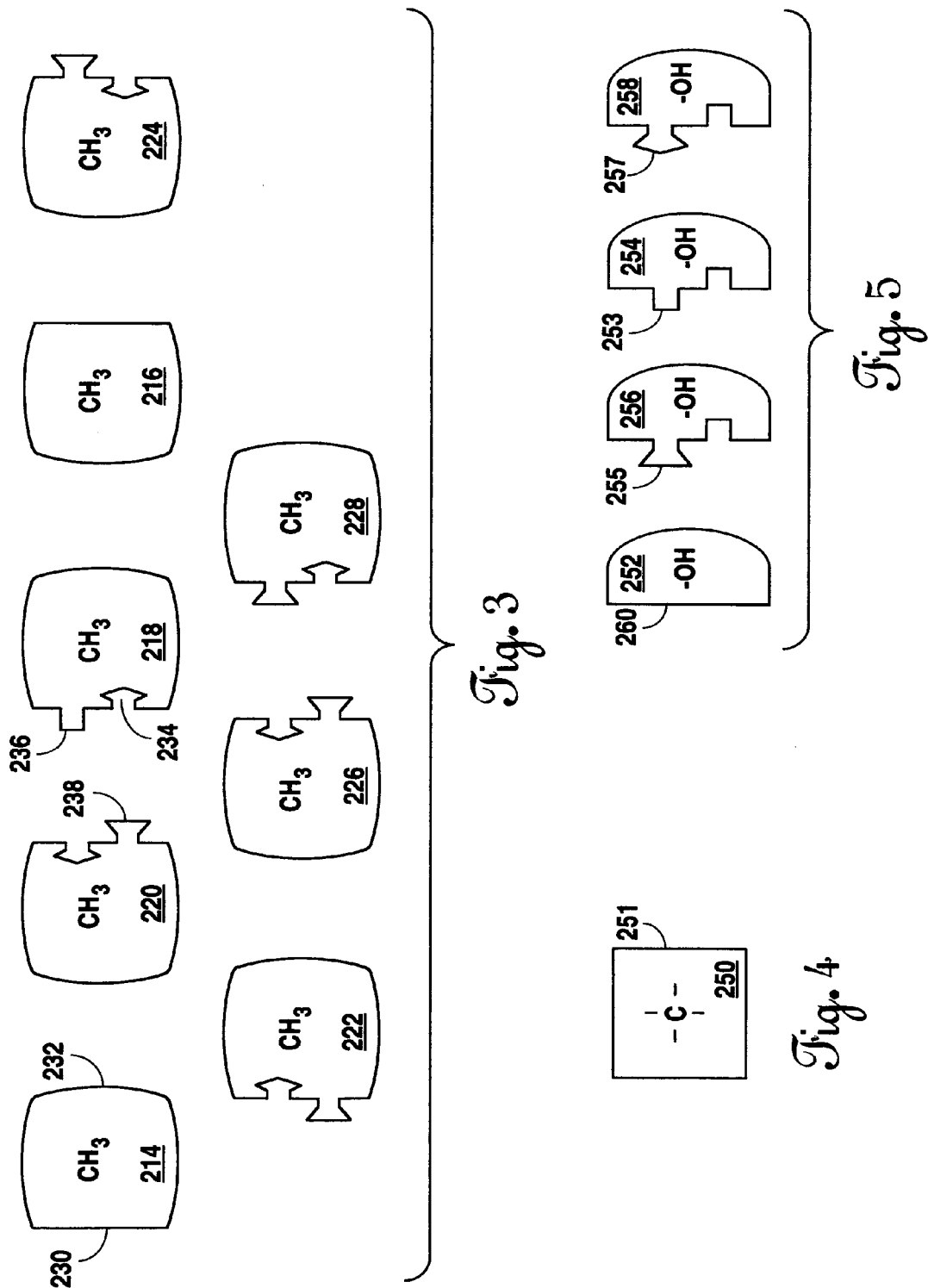

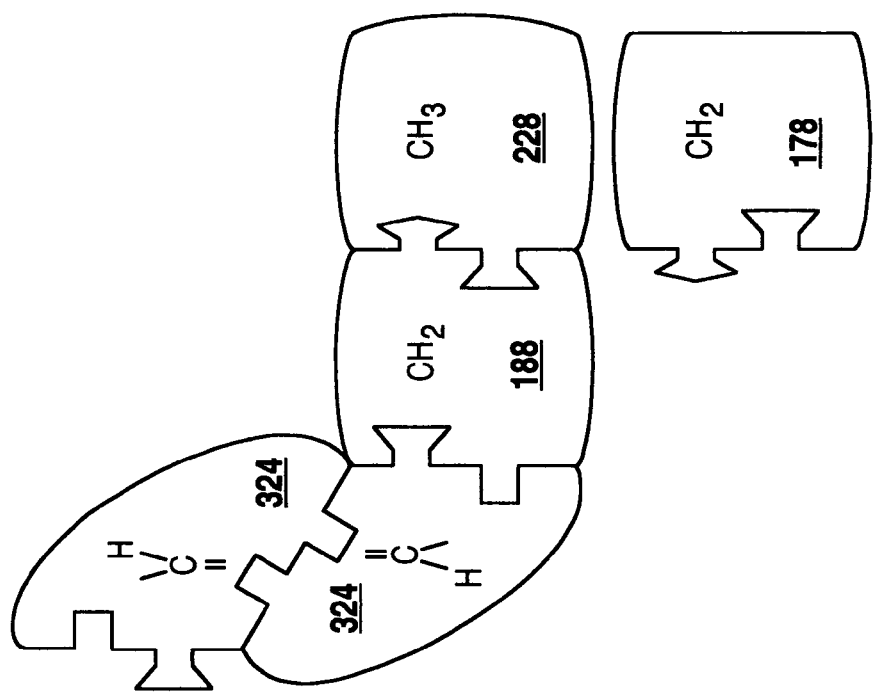
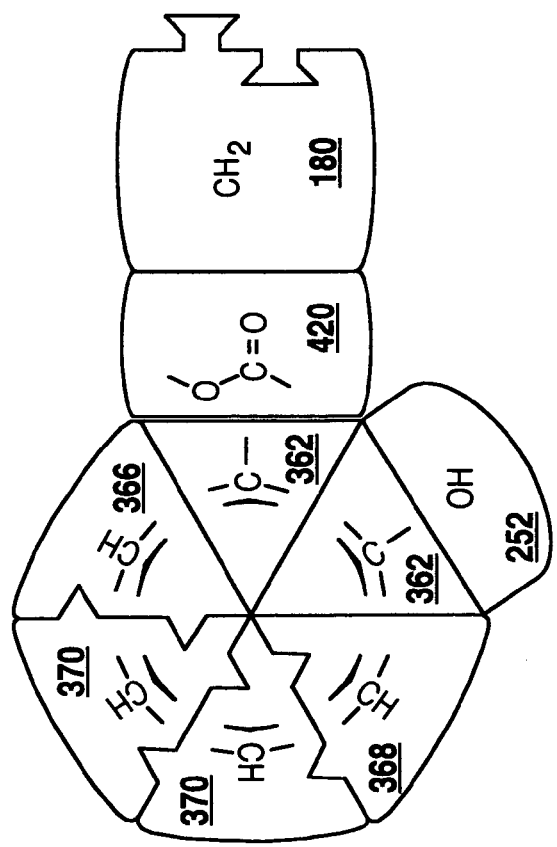
Fig. 14a

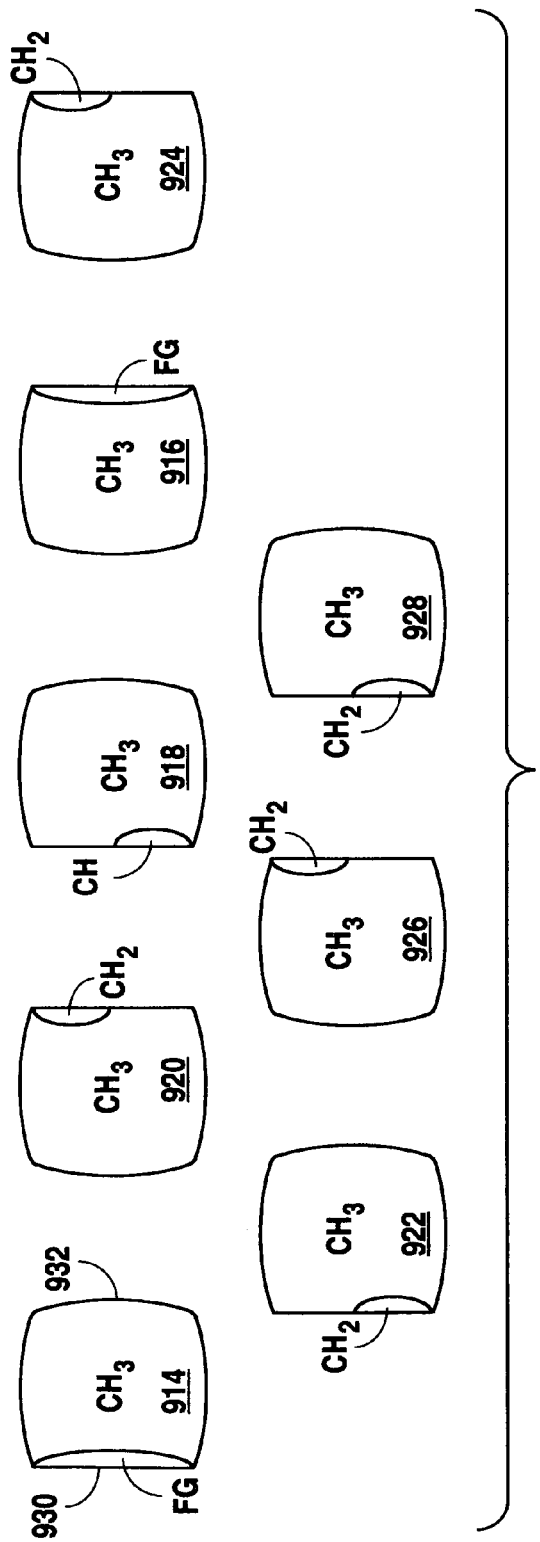
Fig. 17
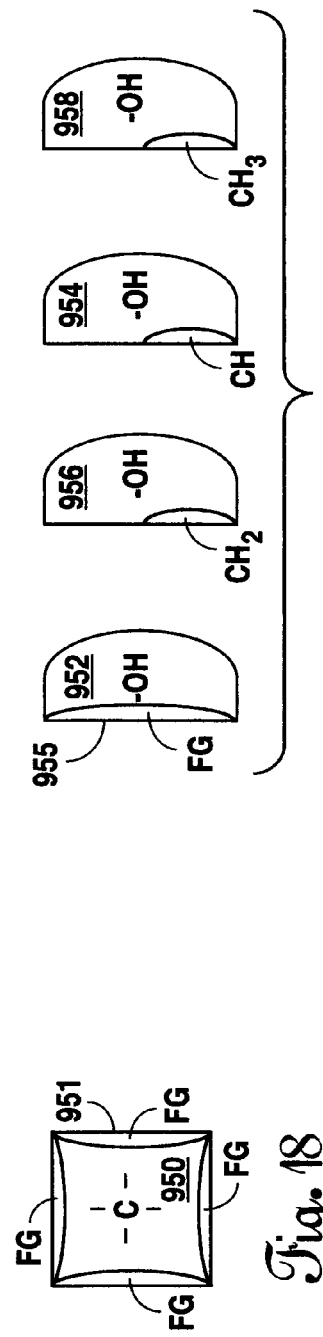
Fig. 19
Fig. 18

NMR TEACHING METHOD AND APPARATUS

This application is a continuation in part of U.S. patent application Ser. No. 10/625,358 filed Jul. 23, 2003, entitled "NMR Teaching Method and Apparatus".

BACKGROUND OF THE INVENTION

1. Field of the Invention

Applicant's invention relates to a method and apparatus for teaching students the principles of structural analysis using nuclear magnetic resonance (NMR) spectroscopy.

2. Background Information

Nuclear magnetic resonance (NMR) spectroscopy is used for the study of molecular structure through measurement of the interaction of an oscillating radio-frequency electromagnetic field with a collection of nuclei immersed in a strong external magnetic field. These nuclei are parts of the atoms that are assembled into these molecules.

Once the NMR spectrum is obtained, the determination of the unknown structure is based on three requirements indicated on the spectrum. These three requirements are integration, splitting due to spin-spin coupling, and chemical shift. Each anticipated chemical fragment is determined from the chemical shift on the spectrum. Chemically different hydrogens in a molecule do not experience the same magnetic field. Electrons shield the nucleus thereby reducing the effective magnetic field and requiring energy of a lower frequency to cause resonance. On the other hand, when electrons are withdrawn from a nucleus, the nucleus is deshielded and feels a stronger magnetic field requiring more energy (higher frequency) to cause resonance. Thus, the NMR spectrum can provide information about a hydrogen's electronic environment. Generally, hydrogens bound to carbons attached to electron withdrawing groups tend to resonate at higher frequencies (more downfield, to the left of the spectrum) from TMS, tetramethylsilane, a common NMR standard. The position of where a particular hydrogen atom resonates relative to TMS is called the chemical shift.

Integration is the second item that can be determined from an NMR spectrum. For the integration, the area under the NMR resonance is proportional to the number of hydrogens that contribute to that resonance. In this way, by measuring or integrating the number of different NMR resonances, information concerning the relative number of chemically distinct hydrogens can be obtained. Experimentally, the integrals often appear as a line over the NMR spectrum. Integration only gives information on the relative number of different hydrogens on the represented chemical fragment, not the absolute number.

The last item of information that can be determined from the NMR spectrum is splitting. The spectrum provides information on how many hydrogen neighbors exist for a particular hydrogen or group of equivalent hydrogens. In general, an NMR resonance will be split into N+1 peaks where N is the number of hydrogens on the adjacent atom or atoms. If there are no hydrogens on the adjacent atoms, then the resonance will remain a single peak, a singlet. If there is one hydrogen on the adjacent atoms, the resonance will be split into two peaks of equal size to form a doublet. Two hydrogens on the adjacent atoms will split the resonance into three peaks with a ratio of 1:2:1 being a triplet. If there are three hydrogens on the adjacent atoms, the resonance will split into four peaks with an area in the ratio of 1:3:3:1 forming a quartet.

When a student is first introduced to these concepts in an organic chemistry course, he or she does not typically have difficulty determining the identity of an unknown molecule as long as the molecule remains fairly simple, such as a molecule having only a few carbons. However, as the molecules become larger and multiply branched, structural determination by the student becomes quite difficult if not impossible.

Every full year organic chemistry text includes a chapter or half a chapter on NMR spectroscopy. Subsequent chapters then include practice problems involving NMR interpretation. NMR in these texts is taught the same way. First the authors start with a molecule and explain its spectrum. This is done for several molecules pointing out the chemical shifts, integration and splitting patterns. Several texts point out common patterns, but most leave it to the students to figure out how to go from the spectrum to the molecule. This is a much more difficult process. In some texts, some simple rules are given such as (1) count the number of signals which is equal to the number of types of hydrogens, (2) figure out the chemical fragments from the chemical shifts, (3) and solve the problem.

While this can work for simple molecules it is virtually guaranteed to fail for more complex spectra. Unfortunately, there are currently no "hands-on" educational tools available to assist students with molecular structure identification from NMR spectra, particularly complex spectra. The present invention satisfies this need for a "hands-on" NMR educational tool that can assist students in NMR structural analysis.

SUMMARY OF THE INVENTION

More specifically, the present invention provides an NMR teaching method and apparatus incorporating a series of pieces that represent chemical functional groups such as methine, methylene, methyl, amine, alkene, aromatic ring, alcohol, thiol, aldehyde, ketone, and halide groups. Each piece typically has the number of sides that corresponds to the number of bonds present around the central atom. Bonds to hydrogen are preferably curved while bonding sides are flat.

The presence of concavities and convex tabs on the bonding sides indicates bonding of the respective piece to a mating piece that causes splitting of the NMR peak. The shape of concavities on each piece is indicative of the number of hydrogens on the respective piece while the shape of the convex tab of the respective piece is indicative of the number of hydrogens on the mating piece.

In a second embodiment of the present invention, the NMR teaching method and apparatus again incorporates a series of pieces that represent chemical functional groups such as methine, methylene, methyl, amine, alkene, aromatic ring, alcohol, thiol, aldehyde, ketone, and halide groups. These pieces typically have the number of sides that corresponds to the number of bonds present around the central atom. Bonds to hydrogen are again preferably curved while bonding sides are flat.

The presence of first bonding indicators on the bonding sides indicates bonding of the respective piece to a mating piece that does not cause splitting of the NMR peak. The presence of second bonding indicators on the bonding sides indicates bonding of the respective piece to mating piece that causes splitting of the NMR peak. Indicia are provided on the face of the pieces to identify the respective piece while the color of the bonding indicator is indicative of the color of the mating piece.

When presented with an NMR spectrum, a student user can select the necessary pieces of the present invention by using the chemical shift, integration, and splitting data from the spectrum. Once the pieces are selected, the student user can then assemble the pieces to determine the identity of the unknown molecule in the NMR spectrum. This tool and method of both embodiments can be used with not only small unknown molecules but large molecules as well, thus permitting the student user to learn NMR structural identification in a simple and relaxed manner.

BRIEF DESCRIPTION OF THE DRAWINGS

FIG. 3 is a top view of the methyl pieces $CH_3$ of the present invention.

FIG. 4 is a top view of the quaternary carbon piece of the present invention.

FIG. 5 is a top view of the alcohol and thiol group pieces of the present invention.

FIG. 14A is a perspective view of the preferred embodiment of the present invention used to make a first attempt at constructing a molecule.

FIG. 17 is a top view of the methyl pieces CHu of the second embodiment of the present invention.

FIG. 18 is a top view of the quaternary carbon piece of the second embodiment of the present invention.

FIG. 19 is a top view of the alcohol and thiol group pieces of the second embodiment of the present invention.

DETAILED DESCRIPTION OF THE PREFERRED EMBODIMENT

Figure 1:
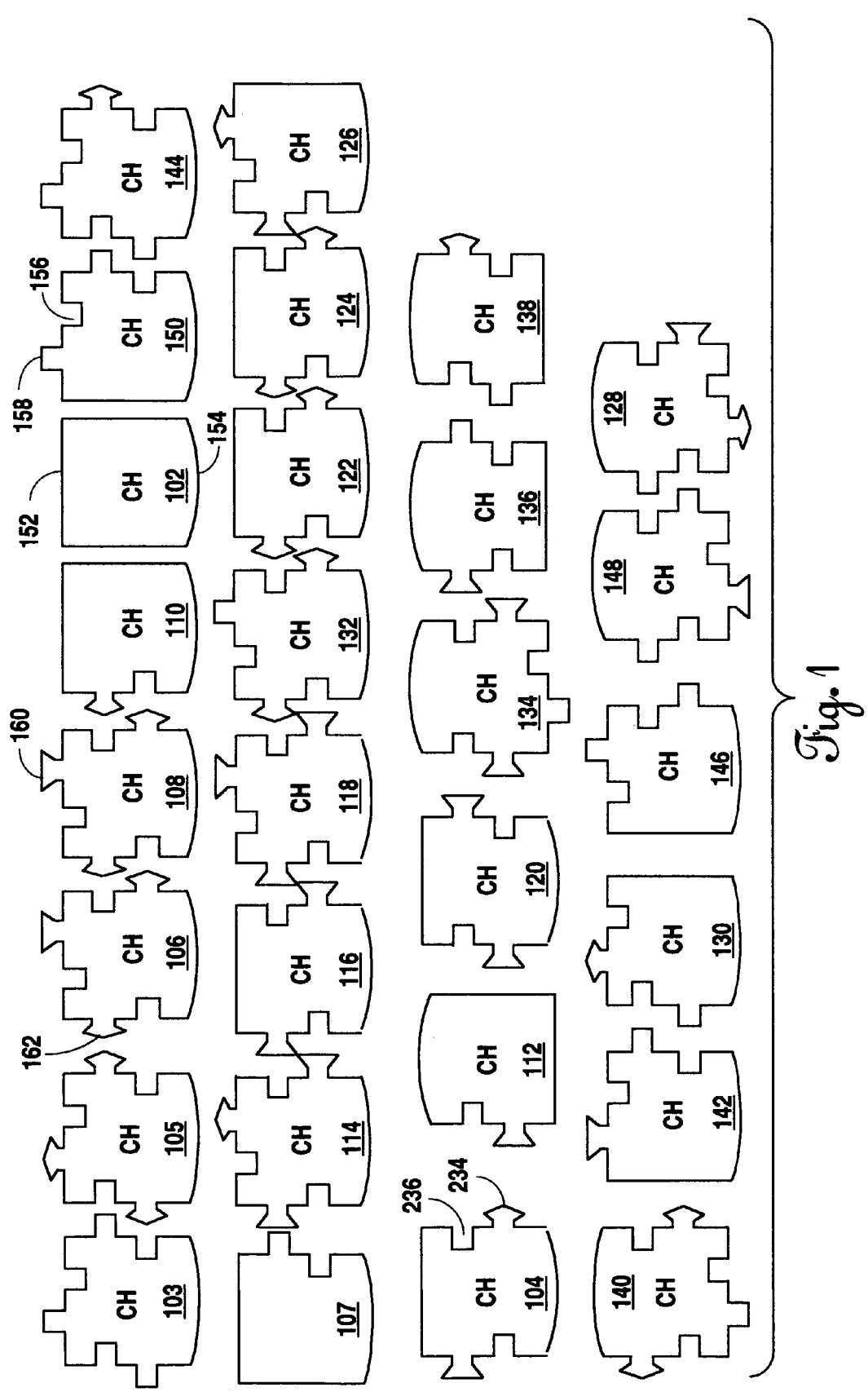
FIG. 1 is a top view of the methine CH pieces of the present invention.

FIGS. 1–13 illustrate various pieces that are currently available in the preferred embodiment of the present invention; however, several additional pieces are anticipated to cover additional chemical fragments. Duplicates of pieces are obviously possible in the preferred embodiment and some duplicate pieces have been included to emphasize this. In addition, mirror images of pieces are also possible as are pieces having the convex tab and concavity reversed on each respective side. The pieces can be provided with the sides in a different order such as in the case for the methine pieces. These pieces are also referred to herein as cutouts, which can be either two-dimensional or three-dimensional pieces. Two-dimensional cutouts would include pieces visible on a computer screen or pieces made of a thin, lightweight material such as paper or cardboard. Three-dimensional cutouts would include pieces made of a thick material such as wood or plastic.

The NMR splitting side and non-splitting side can also be reversed. Some examples of this are provided, but are by no means inclusive of all possibilities.

Each piece of the present invention typically has the number of sides corresponding to the number of bonds present around the central atom. Bonds to hydrogen are preferably curved but can be any shape that indicates no further pieces bind to that respective side. Bonding sides are flat being either with or without both concavities and convex tabs. The presence of concavities and convex tabs on the piece indicates bonding is to be made to an atom(s) or group(s) that causes splitting of the NMR peak, whereas a piece not having concavities and convex tabs is indicative of bonding to an atom(s) or group(s) that does not cause splitting. The shape of the concavities indicates the number of splitting hydrogens on that chosen piece, while the shape of the convex tabs indicates the number of hydrogens on the piece to which the chosen piece is to be bonded. ALl convex tabs interlock with the respective concavities present on the adjoining piece. No convex tabs or concavities are present on the curved hydrogen sides. Each side of the pieces is the same length unless otherwise indicated.

While the preferred embodiment discusses the use of concavities and convex tabs, any design can be utilized in place of the concavities and convex tabs as long as the substitute design for the concavities represents the number of splitting hydrogens on the chosen piece and the substitute design for the convex tabs represents the number of hydrogens on the piece to which the chosen piece is to be bonded. In this case, the design can be color, letters, numbers, or an ornamental pattern either written/typed/drawn on the pieces or as a cutout on the pieces, such as, but not limited to curves or magnetic fields.

FIGS. 15–21 illustrate various pieces that are currently available in the second embodiment of the present invention; however, several additional pieces are anticipated to cover additional chemical fragments, many of which have been shown in the preferred embodiment. Mirror images of pieces are also possible as are pieces having the bonding indicators in a different location on the respective side. The pieces can be provided with the sides in a different order such as in the case for the methine pieces. These pieces are also referred to herein as cutouts, which can be either two-dimensional or three-dimensional pieces. Two-dimensional cutouts would include pieces visible on a computer screen or pieces made of a thin, lightweight material such as paper or cardboard.

Three-dimensional cutouts would include pieces made of a thick material such as wood or plastic.

The NMR splitting side and non-splitting side can also be reversed. Some examples of this are provided, but are by no means inclusive of all possibilities.

Each piece of the second embodiment of the present invention has the number of sides corresponding to the number of bonds present around the central atom. Bonds to hydrogen are preferably curved, but can be any shape which indicates no further pieces bind to that respective side. Bonding sides are flat with bonding indicators. No bonding indicators are present on the curved hydrogen sides. Each side of the pieces is the same length unless otherwise indicated.

The presence of first bonding indicators on the bonding sides indicates bonding of the respective piece to a mating piece that does not cause observable splitting of the NMR peak. The presence of second bonding indicators on the bonding sides indicates bonding of the respective piece to a mating piece that causes observable splitting of the NMR peak. Indicia are provided on the face of the pieces to identify the respective piece while the color of the bonding indicator is indicative of the color of the mating piece.

FIG. 1 shows a top view of the methine CH pieces 102–150 of the present invention. These pieces have three bonding sides 152 and one curved hydrogen side 154. One piece 102 is present without concavities and convex tabs and would be bonded to only an atom(s) or group(s) that does not cause observable splitting of the NMR peak. The remaining pieces 103–150 contain concavities and convex tabs. Table 1 illustrates the number of variations possible for the methine pieces 103–150.

TABLE 1

Methine Pieces

| Piece Number | Number of Flat Sides with No Tabs | Number of Sides with Methine Convex Tab | Number of Sides with Methylene Convex Tab | Number of Sides with Methyl Convex Tab |
| --- | --- | --- | --- | --- |
| 102 | 3 | 0 | 0 | 0 |
| 107 | 2 | 1 | 0 | 0 |
| 112 | 2 | 0 | 1 | 0 |
| 110 | 2 | 0 | 0 | 1 |
| 150/146 | 1 | 2 | 0 | 0 |
| 116/120 | 1 | 0 | 2 | 0 |
| 124/122 | 1 | 0 | 0 | 2 |
| 136/142 | 1 | 1 | 1 | 0 |
| 138/130 | 1 | 1 | 0 | 1 |
| 126/104 | 1 | 0 | 1 | 1 |
| 103 | 0 | 3 | 0 | 0 |
| 118 | 0 | 0 | 3 | 0 |
| 105 | 0 | 0 | 0 | 3 |
| 128 | 0 | 1 | 1 | 1 |
| 148 | 0 | 2 | 1 | 0 |
| 144 | 0 | 2 | 0 | 1 |
| 134 | 0 | 1 | 2 | 0 |
| 132/140 | 0 | 1 | 0 | 2 |
| 106/108 | 0 | 0 | 1 | 2 |
| 114 | 0 | 0 | 2 | 1 |

There is only one type of concavity 156 present on these pieces 103–150 since the concavity represents the number of splitting hydrogens on these pieces 103–150. The concavity 156 present on pieces 103–150 has preferably three flat inset sides generally in the shape of a square; however, any shape can be used as long as it is consistent on all methine pieces 103–150 and the convex tabs on all mating pieces.

The convex tabs on pieces 103–150 vary depending on the atom(s) or group(s) to which the pieces 103–150 can be bound. Where pieces 103–150 are to be bound to a mating piece representing a group having one hydrogen, such as another methine piece, the convex tab 158 will preferably have three flat sides generally in the shape of a square; however, any shape can be used as long as it is consistent for the concavity of the mating piece. Pieces 103, 107, and 128–150 are capable of being bound to a mating piece representing a group having one hydrogen, such as another methine piece 103–150. Pieces 107 and 128–142 are capable of binding to only one mating piece representing a group having one hydrogen; however, pieces 144–150 are capable of binding to two mating pieces representing a group having one hydrogen. Piece 103 can bind three mating pieces representing a group having one hydrogen.

Where pieces 103–150 are to be bound to a mating piece representing a group having two hydrogens, such as a methylene $CH_2$ piece, the convex tab 160 is preferably shaped as an equilateral triangle, but can be any shape as long as it is consistent for the concavity of the mating piece. Pieces 104, 106, 108, 112, 114, 116, 118, 120, 126, 128, 134, 136, 142, and 148 all have convex tabs 160 and are capable of binding to at least one mating piece representing a group having two hydrogens. Pieces 104, 106, 108, 112, 126, 128, 136, 142 and 148 are capable of binding to only one mating piece representing a group having two hydrogens. Pieces 114, 116, 120, and 134 can bind to as many as two mating pieces representing a group having two hydrogens while piece 118 can bind to three mating pieces representing a group having two hydrogens.

Pieces 103–150 can also be bound to a mating piece representing a group having three hydrogens, such as a methyl $CH_3$ piece. Where a piece 103–150 is bound to a mating piece representing a group having three hydrogens, the convex tab 162 is preferably shaped as a diamond; however, any shape can be used as long as it is consistent with the concavity of the mating piece. Pieces 104, 105, 106, 108, 110, 114, 122, 124, 126, 128, 130, 132, 138, 140, and 144 have convex tabs 162 that can bind to mating pieces representing a group having three hydrogens. Pieces 104, 110, 114, 126, 128, 130, 138, and 144 can bind to one mating piece representing a group having three hydrogens while pieces 106, 108, 122, 124, 132, and 140 are capable of binding to as many as two mating pieces representing a group having three hydrogens. Piece 105 can bind to three mating pieces representing a group having three hydrogens.

Figure 2:
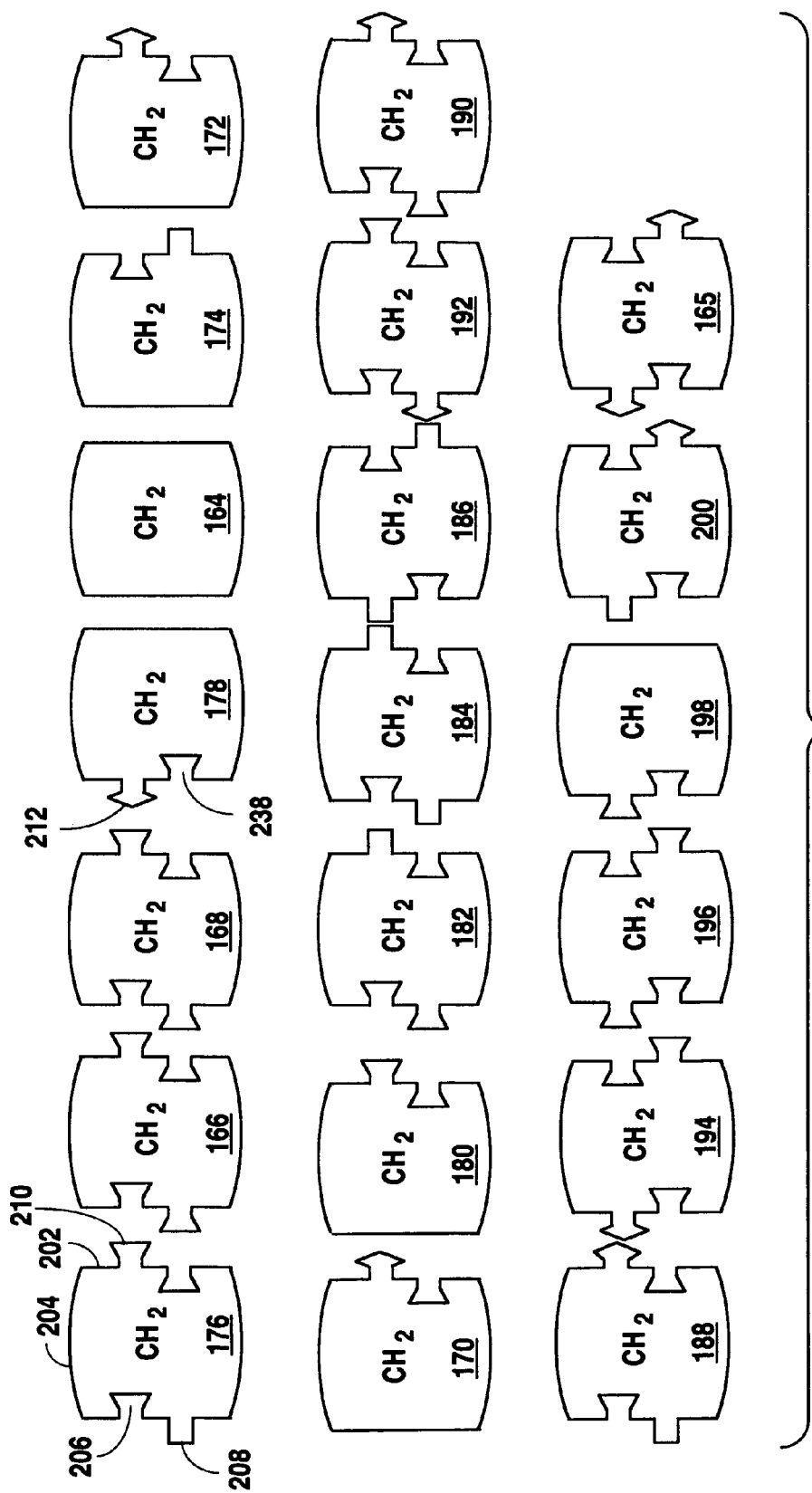
FIG. 2 is a top view of the methylene $CH_2$ pieces of the present invention.

FIG. 2 is a top view of the methylene $CH_2$ pieces 164–200 of the present invention. These pieces have two bonding sides 202 and two curved hydrogen sides 204. One piece 164 is present without concavities and convex tabs and can be bonded to an atom(s) or group(s) that does not cause observable splitting of the NMR peak. The remaining pieces 165–200 contain concavities and convex tabs. Table 2 illustrates the number of variations possible for the methylene pieces 165–200.

TABLE 2

Methylene Pieces

| Piece Number | Number of Flat Sides with No Tabs | Number of Sides with Methine Convex Tab | Number of Sides with Methylene Convex Tab | Number of Sides with Methyl Convex Tab |
| --- | --- | --- | --- | --- |
| 164 | 2 | 0 | 0 | 0 |
| 174 | 1 | 1 | 0 | 0 |
| 180/198 | 1 | 0 | 1 | 0 |
| 178/172/170 | 1 | 0 | 0 | 1 |

TABLE 2-continued

Methylene Pieces

| Piece Number | Number of Flat Sides with No Tabs | Number of Sides with Methine Convex Tab | Number of Sides with Methylene Convex Tab | Number of Sides with Methyl Convex Tab |
|---|---|---|---|---|
| 186/184 | 0 | 2 | 0 | 0 |
| 166/196/168 | 0 | 0 | 2 | 0 |
| 165 | 0 | 0 | 0 | 2 |
| 176/182 | 0 | 1 | 1 | 0 |
| 188/200 | 0 | 1 | 0 | 1 |
| 192/190/194 | 0 | 0 | 1 | 1 |

There is only one type of concavity 206 present on methylene pieces 165–200. This concavity 206 is preferably in the shape of an equilateral triangle, however, any shape can be used as long as it is consistent on all methylene pieces 165–200 and the convex tabs on all mating pieces.

The convex tabs on pieces 165–200 vary depending on the atom(s) or group(s) to which they are bound. The convex tab 208 will preferably have three flat sides generally in the shape of a square where pieces 165–200 are bound to a mating piece representing a group having one hydrogen, such as a methine piece. However, the shape of convex tab 208 can vary as long as the shape used is consistent with the concavity of the mating piece. Pieces 174, 176, 182, 188, and 200 can bind to a mating piece representing an atom(s) or group(s) having one hydrogen while pieces 184 and 186 are capable of binding two mating pieces representing an atom(s) or group(s) having one hydrogen.

Where pieces 165–200 are bound to mating piece representing a group having two hydrogens, such as another methylene CH$_2$ piece, the convex tab 210 is preferably shaped as an equilateral triangle, but can be any shape as long as it is consistent with the concavity of the mating piece. Pieces 166, 168, 176, 180, 182, 190, 192, 194, 196, and 198 have convex tabs 210 that are capable of binding to at least one mating piece representing a group having two hydrogens. Pieces 176, 180, 182, 190, 192, 194, and 198 can bind only one mating piece representing a group having two hydrogens while pieces 166, 168, and 196 can bind as many as two mating pieces representing a group having two hydrogens.

Methylene pieces 165–200 can also be bound to a mating piece representing a group having three hydrogens, such as methyl CH$_3$ piece. Where a methylene piece 165–200 is bound to a mating piece representing a group having three hydrogens, the convex tab 212 is preferably shaped as a diamond; however, any shape can be used as long as it is consistent with the concavity of the mating piece. Pieces 170, 172, 178, 188, 190, 192, 194, and 200 have a convex tab 212 that can bind to mating pieces representing a group having three hydrogens and can bind to these mating pieces in one location. Piece 165 can bind to a mating piece representing a group having three hydrogens in two locations.

In FIG. 3 a top view of the methyl pieces CH$_3$ 214–228 of the present invention is shown. These pieces have one bonding side 230 and three curved hydrogen sides 232. Two pieces 214 and 216 are present without concavities and convex tabs and would be bonded to an atom(s) or group(s) that does not cause splitting of the NMR peak. The remaining pieces 218–228 contain concavities and convex tabs. Table 3 illustrates the number of variations possible for the methyl pieces.

TABLE 3

Methyl Pieces

| Piece Number | Number of Flat Sides with No Tabs | Number of Sides with Methine Convex Tab | Number of Sides with Methylene Convex Tab | Number of Sides with Methyl Convex Tab |
|---|---|---|---|---|
| 214/216 | 1 | 0 | 0 | 0 |
| 218 | 0 | 1 | 0 | 0 |
| 220/224/222/228 | 0 | 0 | 1 | 0 |

There is only one type of concavity 234 present on pieces 218–228 which is preferably in the shape of a diamond; however, any shape can be used as long as it is consistent on all methyl pieces 218–228 and the convex tabs of all mating pieces.

The convex tabs on pieces 218–228 vary depending on the atom(s) or group(s) to which the pieces 218–228 are bound. Where pieces 218–228 are bound to a mating piece representing a group having one hydrogen, such as a methine piece, the convex tab 236 will preferably have three flat sides generally in the shape of a square; however, any shape can be used as long as it is consistent for the concavity of the mating piece. Piece 218 is capable of binding to one mating piece representing a group having one hydrogen.

Where methyl pieces 218–228 are bound to a mating piece representing a group having two hydrogens, such as a methylene piece, the convex tab 238 is preferably shaped as an equilateral triangle, but can be any shape as long as it is consistent for the concavity of the mating piece. Pieces 220–228 have convex tab 238 and are capable of binding to one mating piece representing a group having two hydrogens.

A methyl piece having a diamond shaped convex tab that can bind to a mating piece representing a group having three hydrogens is not present in the invention as it represents ethane that gives a singlet on the NMR spectrum.

FIG. 4 shows a top view of the quaternary carbon piece 250 of the present invention. This piece 250 has four flat bonding sides 251 without any concavities or convex tabs.

FIG. 5 is a top view of the alcohol and thiol group pieces 252–258 of the present invention. These pieces have one bonding side 260 with the remainder of the piece being preferably rounded; however, any shape is possible for this remainder side as long as it is shaped so that no other connections are possible. One piece 252 is present without concavities and convex tabs and would be bonded to an atom(s) or group(s) in which splitting is not observed. The remaining pieces 254–258 contain concavities and convex tabs.

The concavity present on pieces 254–258 has preferably three flat inset sides generally in the shape of a square identical to the concavity mentioned for the methine pieces 103–150; however, any shape can be used as long as it is consistent on all alcohol and thiol group pieces 254–258 and with the convex tabs of all mating pieces such as, but not limited to, 208, 158 and 236.

The convex tabs vary depending on the atom(s) or group(s) to which the pieces are bound. Piece 254 has a convex tab 253 preferably having three flat sides generally in the shape of a square; however, any shape can be used as long as it is consistent for the concavity of the mating piece. In this case, the mating piece would be representative of a group having one hydrogen, such as a methine piece. Piece 256 has a convex tab 255 preferably being in the shape of an equilateral triangle, but can be any shape as long as it is consistent for the concavity of the mating piece. In this case, the mating piece would be representative of a group having two hydrogens, such as a methylene piece. And piece 258 has a convex tab 257 preferably being in the shape of a diamond, but can be any shape as long as it is consistent for the concavity of the mating piece. In this case, the mating piece is representative of a group having three hydrogens, such as a methyl piece.

Figure 6:
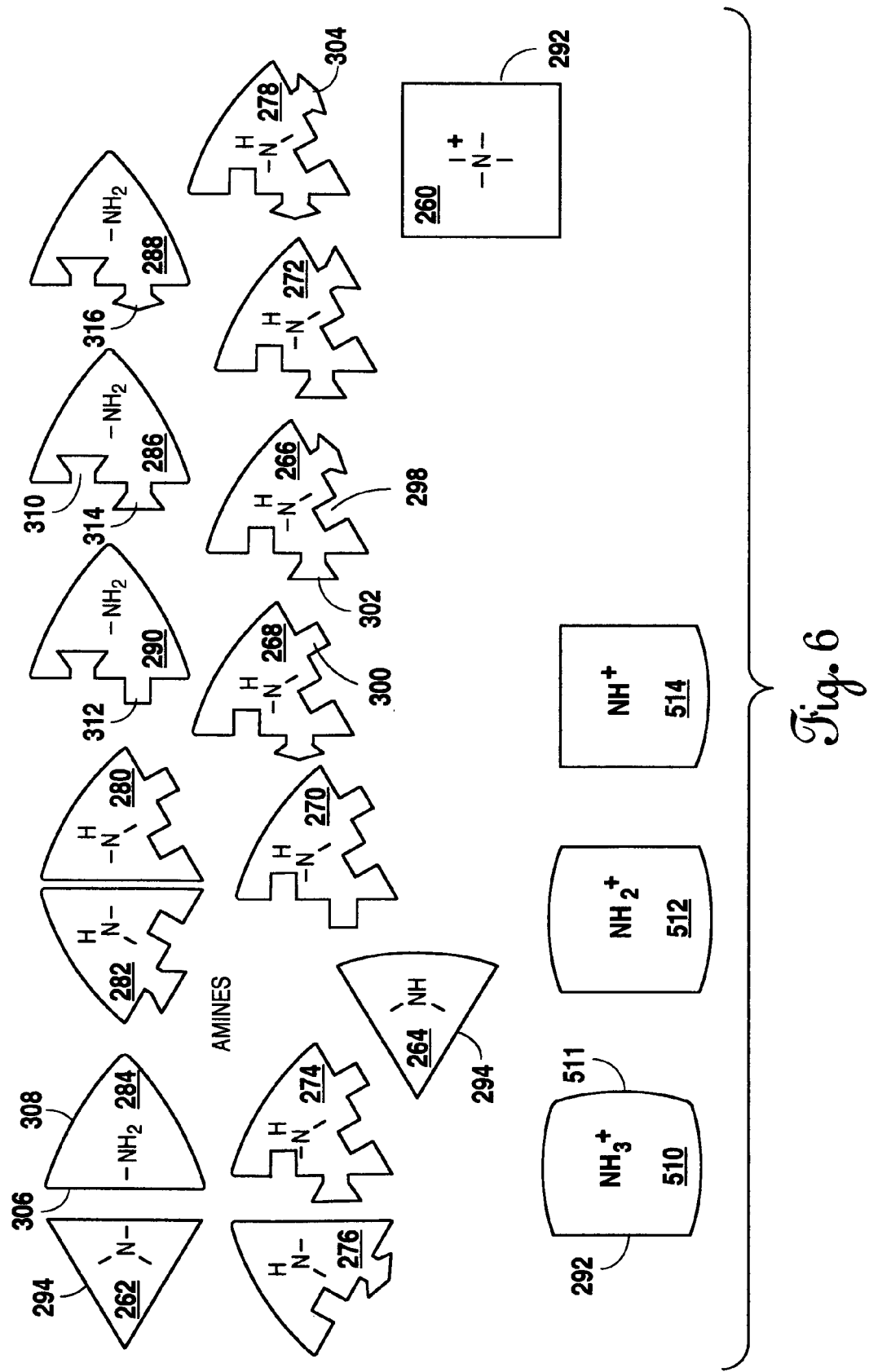
FIG. 6 is a top view of the amine pieces of the present invention.

In FIG. 6 a top view of the amine pieces 260–290, 510, 512 and 514 of the present invention is shown. The quaternary amines are pieces 260, 510, 512 and 514. Piece 260 has four bonding sides 292. Piece 510 has one bonding side 292 and three curved hydrogen sides 511. Piece 510 is present without concavities and convex tabs and would be bonded to an atom(s) or group(s) that does not cause observable splitting of the NMR peak. Piece 510 can be modified to include the concavities and convex tabs previously discussed for the methyl pieces on the bonding side 292.

For piece 512 there are two bonding sides 292 and two curved hydrogen sides 511. This piece 512 is present without concavities and convex tabs and would be bound to an atom(s) or group(s) that does not cause observable splitting of the NMR peak. Piece 512 can be modified to include the concavities and convex tabs previously discussed for the methylene pieces on the bonding sides 292.

Piece 514 has three bonding sides 292 and one curved hydrogen side 511. Piece 514 is present without concavities and convex tabs and would be bonded to an atom(s) or group(s) that does not cause observable splitting of the NMR peak. Piece 514 can be modified to include the concavities and convex tabs previously discussed for the methine pieces on the bonding sides 292.

The remaining amine pieces 262–290 have three sides and have the basic shape of an equilateral triangle. Piece 262, representative of a tertiary amine, has three bonding sides 294 without concavities and convex tabs and therefore would be bonded to a similar flat side since this nitrogen has no hydrogen to split its neighbor group.

Pieces 264–282, representative of secondary amines, contain two bonding sides 294 and one curved hydrogen side 308. Piece 264 is present without concavities and convex tabs and would be bonded to atom(s) or group(s) in which no splitting is observed. The remaining pieces 266–282 have concavities and convex tabs. Table 4 illustrates the number of variations possible for the amine pieces.

TABLE 4

Secondary Amine Pieces

| Piece Number | Number of Flat Sides with No Tabs | Number of Sides with Square Convex Tab | Number of Sides with Triangle Convex Tab | Number of Sides with Diamond Convex Tab |
| --- | --- | --- | --- | --- |
| 264 | 2 | 0 | 0 | 0 |
| 280 | 1 | 1 | 0 | 0 |
| 282 | 1 | 0 | 1 | 0 |
| 276 | 1 | 0 | 0 | 1 |
| 270 | 0 | 2 | 0 | 0 |
| 272 | 0 | 0 | 2 | 0 |
| 278 | 0 | 0 | 0 | 2 |
| 274 | 0 | 1 | 1 | 0 |
| 268 | 0 | 1 | 0 | 1 |
| 266 | 0 | 0 | 1 | 1 |

There is only one type of concavity 298 present on these secondary amine pieces 266–282 since the concavity represents the number of splitting hydrogens on the pieces. The concavity 298 present on these pieces has preferably three flat inset sides generally in the shape of a square; however, any shape can be used as long as it is consistent on all secondary amine pieces 266–282 as well as with the convex tabs of all mating pieces.

The convex tabs vary on pieces 266–282 depending on the atom(s) or group(s) to which the piece can be bound. When the atom(s) or group(s) to which pieces 266–282 are bound has one hydrogen, the convex tab 300 will preferably have three flat sides generally in the shape of a square; however, any shape can be used as long as it is consistent for the concavity of the mating piece. Pieces 268, 270, 274, and 280 are all capable of binding to a piece representing atom(s) or group(s) with one hydrogen. Pieces 268, 274, and 280 can bind only one piece representing atom(s) or group(s) with one hydrogen; whereas piece 270 can bond to two such pieces.

When the mating piece to which pieces 266–282 are bound represents a group having two hydrogens, the convex tab 302 is preferably shaped as an equilateral triangle; however, any shape can be used as long as it is consistent for the concavity of the mating piece. Pieces 266, 272, 274 and 282 are capable of bonding to a piece representing atom(s) or group(s) with two hydrogens. Pieces 266, 274, and 282 are capable of bonding to only one piece representing atom(s) or group(s) with two hydrogens with piece 272 being capable of binding to two such pieces.

When the mating piece to which piece 266–282 is bound has three hydrogens, the convex tab 304 is preferably shaped as a diamond; however, any shape can be used as long as it is consistent for the concavity of the mating piece. Pieces 266, 268, 276 and 278 are capable of bonding to a piece representing atom(s) or group(s) with three hydrogens. Pieces 266, 268, and 276 are capable of bonding to only one piece representing atom(s) or group(s) with three hydrogens and piece 278 is capable of bonding two such pieces.

Pieces 284–290, representing primary amines, have one bonding side 306 and two curved hydrogen sides 308. One piece 284 is present without concavities and convex tabs and would be bonded to an atom(s) or group(s) in which splitting of the NMR peak is not observed. The remaining pieces 286–290 contain concavities and convex tabs. Table 5 illustrates the number of variations possible for these pieces.

TABLE 5

Primary Amine Pieces

| Piece Number | Number of Flat Sides with No Tabs | Number of Sides with Square Convex Tab | Number of Sides with Triangle Convex Tab | Number of Sides with Diamond Convex Tab |
| --- | --- | --- | --- | --- |
| 284 | 1 | 0 | 0 | 0 |
| 290 | 0 | 1 | 0 | 0 |
| 286 | 0 | 0 | 1 | 0 |
| 288 | 0 | 0 | 0 | 1 |

There is only one type of concavity 310 present on these pieces 286–290 since the concavity represents the number of splitting hydrogens on these pieces. The concavity 310 present on pieces 286–290 is preferably shaped as an equilateral triangle; however, any shape can be used as long as it is consistent for all primary amine pieces 286–290 and with the convex tabs of all mating pieces, including, but not limited to convex tabs 210, 238, 255, 160, 406, 349, 302, 314, 505, 517, 604, and 717.

The convex tabs on pieces 286–290 vary depending on the atom(s) or group(s) to which the pieces 286–290 are bound. Piece 290 is designed to bind to a piece representing atom(s) or group(s) having one splitting hydrogen. Piece 290 has a convex tab 312 having preferably three flat sides generally in the shape of a square; however, any shape can be used as long as it is consistent for the concavity of the mating piece.

Piece 286 is designed to bind to a piece representing atom(s) or group(s) having two splitting hydrogens. This piece 286 has a convex tab 314 being generally in the shape of an equilateral triangle; however, any shape can be used as long as it is consistent for the concavity of the mating piece.

The remaining piece 288 is designed to bond to a piece representing atom(s) or group(s) having three hydrogens. Piece 288 has a convex tab 314 preferably shaped as a diamond; however, any shape can be used as long as it is consistent for the concavity of the mating piece.

Figure 7:
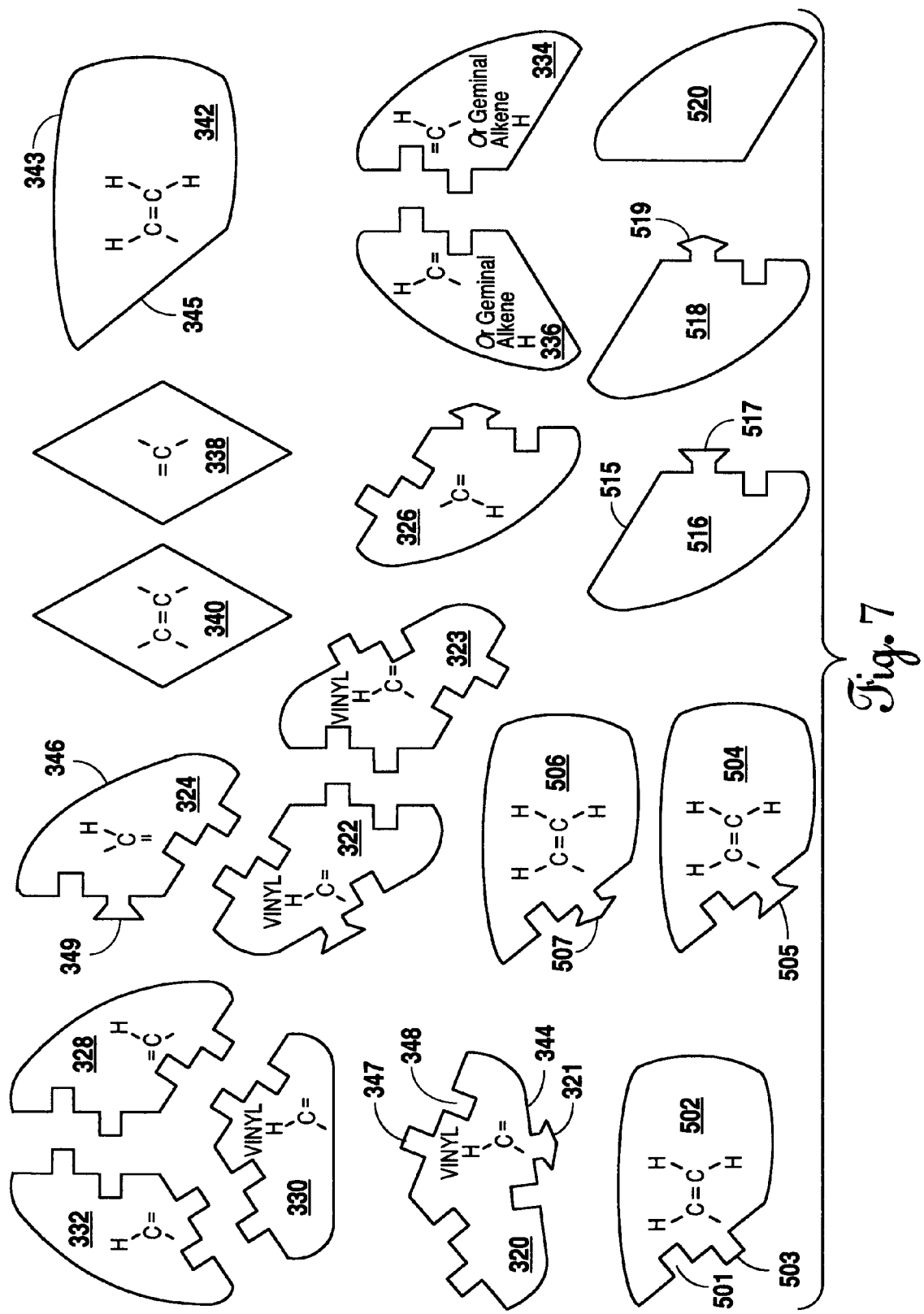
FIG. 7 is a top view of the alkene pieces of the present invention.

FIG. 7 is a top view of the alkene pieces 320–342, 502, 504, 506, 516, 518 and 520 of the present invention. The alkene pieces 320–342, 502, 504, 506, 516, 518 and 520 are complex in that the geminal hydrogens can appear at different locations in the NMR spectrum; therefore, each piece does not necessarily represent a single carbon with all its hydrogens. Pieces 320–342, 516, 518, and 520 have at least one flat bonding side 344 and may or may not have a curved hydrogen side 346. Pieces 338 and 340 are shaped as diamonds with all sides of equal length and represent alkene carbons without hydrogens. These pieces 338 and 340 are present without concavities and convex tabs which indicates that these pieces do not cause observable splitting of their neighbor, so would be attached at a matching flat bonding side. Pieces 320–342, 502, 504, 506, 516, 518 and 520 permit assembly of mono-, di-, tri- and tetra-substituted alkenes.

Pieces 320–336, 516, 518 and 520 are shaped as isosceles triangles with each piece representing one of the alkene hydrogens. These pieces have at least two flat bonding sides 344 and may or may not have one curved hydrogen side 346. Piece 520 has two flat bonding sides 344 and one curved hydrogen side 346. This piece does not have concavities and convex tabs which indicates this piece does not cause observable splitting of its neighbor. Table 6 illustrates the number of variations possible for the remaining alkene pieces 320–336, 516, 518 and 520.

TABLE 6

Alkene Pieces

| Piece Number | Number of Curved Hydrogen Sides | Number of Flat Sides with No Tabs | Number of Sides with Square Convex Tab | Number of Sides with Triangle Convex Tab | Number of Sides with Diamond Convex Tab |
|---|---|---|---|---|---|
| 334/336 | 1 | 1 | 1 | 0 | 0 |
| 324 | 1 | 0 | 1 | 1 | 0 |
| 326 | 1 | 0 | 1 | 0 | 1 |
| 328/332 | 1 | 0 | 2 | 0 | 0 |
| 323 | 0 | 0 | 3 | 0 | 0 |
| 322 | 0 | 0 | 2 | 1 | 0 |
| 320 | 0 | 0 | 2 | 0 | 1 |
| 330 | 0 | 1 | 2 | 0 | 0 |
| 516 | 1 | 1 | 0 | 1 | 0 |
| 518 | 1 | 1 | 0 | 0 | 1 |
| 520 | 1 | 2 | 0 | 0 | 0 |

There is only one type of concavity 348 present on these remaining alkene pieces 320–336, 516, 518 and 520 since the concavity represents the number of splitting hydrogens on these pieces. The concavity 348 present on pieces 320–336, 516, 518 and 520 has preferably three flat sides generally in the shape of a square; however, any shape can be used as long as it is consistent for these pieces and with the convex tab of the mating piece.

The convex tabs on pieces 320–336, 516, 518 and 520 vary depending on the atom(s) or group(s) to which the pieces 320–336, 516, 518 and 520 are bound. Pieces 320–336 are designed to bind to at least one piece representing an atom(s) or group(s) having one hydrogen. In this instance, the convex tab 347 would preferably have three flat sides generally in the shape of a square; however, any shape can be used as long as it is consistent for the concavity of the mating piece. The most common piece with convex tab 347 that each of these pieces 320–336 is binding is the remaining half of the alkene molecule as dissected by a vertical plane through the molecule, but may also be any other piece representing an atom(s) or group(s) with a single hydrogen. Pieces 320–336, 516, 518 and 520 can also contain convex tabs 349 where the piece is to be bound to an atom(s) or group(s) having two hydrogens. Pieces 322, 324, and 516 have a convex tab 349 being generally in the shape of a triangle; however, any shape can be used as long as it is consistent for the concavity of the mating piece. Pieces 320–336, 516, 518 and 520 can also contain convex tabs 321 where the piece is to be bound to atom(s) or group(s) having three hydrogens. Pieces 320, 326, and 518 have a convex tab 321 being generally in the shape of a diamond; however, any shape can be used as long as it is consistent for the concavity of the mating piece.

More specifically, piece 320 can bind to pieces 322, 323, and 330 due to the square concavity and convex tabs present on one bonding side as well as two other chemical fragments, one chemical fragment having one hydrogen and the other chemical fragment having three hydrogens. This piece 320 along with pieces 322, 323, 328, 330, and 332 are used to make vinyl groups.

Piece 322 can bind to pieces 320, 323, and 330 due to the square concavity and convex tabs present on one bonding side as well as two other chemical fragments, one chemical fragment having one hydrogen and the other chemical fragment having two hydrogens.

Piece 323 can bind to pieces 320, 322, and 330 due to the square concavity and convex tabs present on one bonding side as well as two other chemical fragments each representative of a group having one hydrogen.

Piece 324 can bind to another alkene piece 320–336 due to the square concavity and convex tabs present on one bonding side. The remaining bonding side can bond a piece representing a chemical fragment having two hydrogens.

Piece 326 can bind to another alkene piece 320–336 due to the square concavity and convex tabs present on one bonding side. The remaining bonding side can bond a piece representing a chemical fragment having three hydrogens.

Pieces 328 and 332 can bind to another alkene piece 320–336 due to the square concavity and convex tabs present on one bonding side. The remaining bonding side can bond a piece representing a chemical fragment having one hydrogen.

Piece 330 can bond to pieces 320, 322, and 323 and can additionally bond to a third group which does not observably split the hydrogen.

Pieces 334 and 336 can bind to another alkene piece 320–336 due to the square concavity and convex tabs present on one bonding side. The remaining bonding side can bond a piece representing a group that does not cause observable splitting of the NMR peak.

Piece 516 can bind a piece representing an atom(s) or group(s) having two hydrogens due to the triangular shaped convex tab 517 present on one bonding side. The remaining bonding side 515 can bond a piece representing an atom(s) or group(s) that does not cause observable splitting of the NMR peak.

Piece 518 can bind a piece representing an atom(s) or group(s) having three hydrogens due to the diamond shaped convex tab 519 present on one bonding side. The remaining bonding side 515 can bond a piece representing an atom(s) or group(s) that does not cause observable splitting of the NMR peak.

The vinyl group pieces are represented by pieces 342, 502, 504, and 506. Pieces 342 and 502–506 are shaped as a rectangle with three curved hydrogen sides 343 and one bonding side 345. Bonding side 345 can be either flat 500 as shown in piece 342 or contain concavities 501 and convex tabs 503, 505, and 507 as shown for pieces 502, 504, and 506 respectively. Where concavities and convex tabs are present they indicate that these pieces would be bonded to an atom(s) or group(s) that causes observable splitting of the NMR peak.

Piece 502 has a bonding side 345 that contains concavity 501 and convex tab 503. Convex tab 503 is preferably shaped as a square; however, any shape can be used as long as it is consistent for the concavity of the mating piece. This piece 502 would be bonded to an atom(s) or group(s) having one hydrogen.

Piece 504 is designed to bond to an atom(s) or group(s) having two hydrogens. Piece 504 has concavity 501 and convex tab 505. Convex tab 505 is preferably shaped as an equilateral triangle; however, any shape can be used as long as it is consistent for the concavity of the mating piece.

Piece 506 has a bonding side 345 that contains concavity 501 and convex tab 507. Convex tab 507 is preferably shaped as a diamond; however, any shape can be used as long as it is consistent for the concavity of the mating piece. This piece 506 would be bonded to an atom(s) or group(s) having three hydrogens.

Figure 8A:
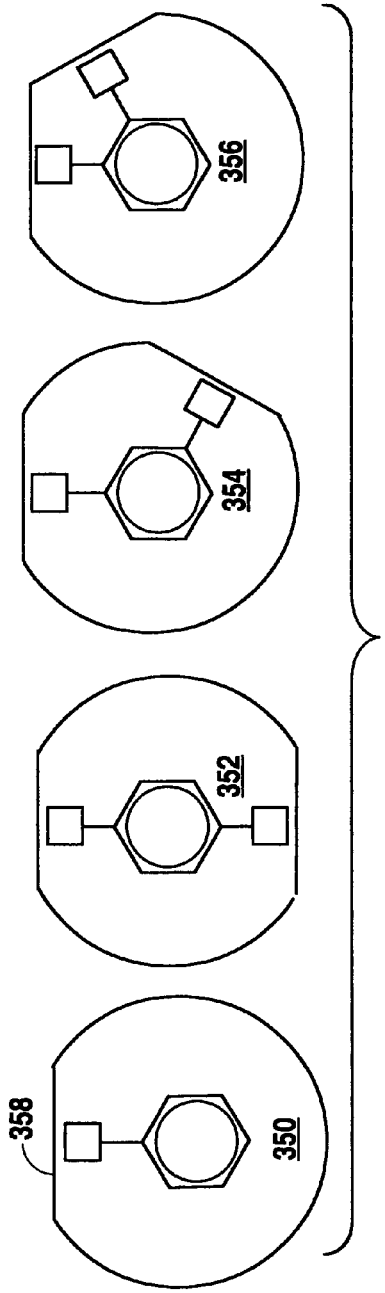
FIG. 8a is a top view of the benzene pieces of the present invention.

FIG. 8a shows a top view of the benzene ring pieces 350–356 of the present invention. The benzene ring pieces 350–356 are represented by a large circle with one, two, three, four, five or six flat sides 358 representing mono- through hexa-substituted benzene rings. The mono-substituted piece is represented by piece 350. The relative position of the flat sides 358 indicates the relative placement of the substituents around the ring. Piece 356 represents an ortho-arrangement of substituents having two flat sides 358 at the ortho-position being 60 degrees apart. Piece 354 represents a meta-arrangement of substituents having two flat sides 358 at the meta-position being 120 degrees apart. Piece 352 represents a para-arrangement of substituents having two flat sides 358 at the para-position being 180 degrees apart. All flat sides 358 for benzene ring pieces 350–356 contain no concavities or convex tabs. Additional pieces can easily be envisioned representing the various tri-, tetra-, penta-, and hexa-substituted rings. The present embodiment can also be extended to other aromatic and polycyclic aromatic groups such as furan, naphthalene, pyridine, and the like.

Figure 8B:
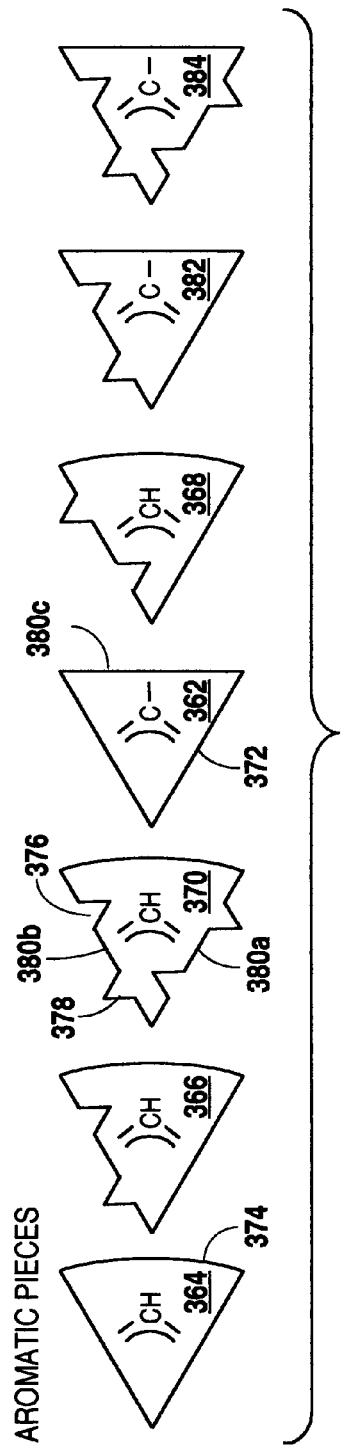
FIG. 8b is a top view of the aromatic pieces of the present invention.

Alternatively, FIG. 8b shows the aromatic carbons of the benzene rings represented as separate aromatic pieces 362–370, 382, and 384. These pieces are preferably shaped as equilateral triangles. Flat sides 372 represent bonding sides while curved sides 374 represent hydrogen sides. Piece 364 does not have concavities and convex tabs which indicates that this piece would be bonded to aromatic carbons or atoms without an attached hydrogen. Piece 362 has no attached hydrogens so it cannot split or be split by its neighbors. The remaining pieces 366–370, 382 and 384 contain concavities and convex tabs on the flat sides 372.

There is one type of concavity 376 present on pieces 366–370, 382, and 384 which has preferably two flat inset sides generally in the shape of a triangle; however, any shape can be used as long as it is consistent on the aromatic pieces. The convex tabs 378 used on the sides 380a and 380b are generally triangular in shape; however, any shape can be used as long as it is consistent with the concavity of the remaining aromatic pieces to which it is bound. This scheme can be extended to include polycyclic aromatic rings.

Figure 9:
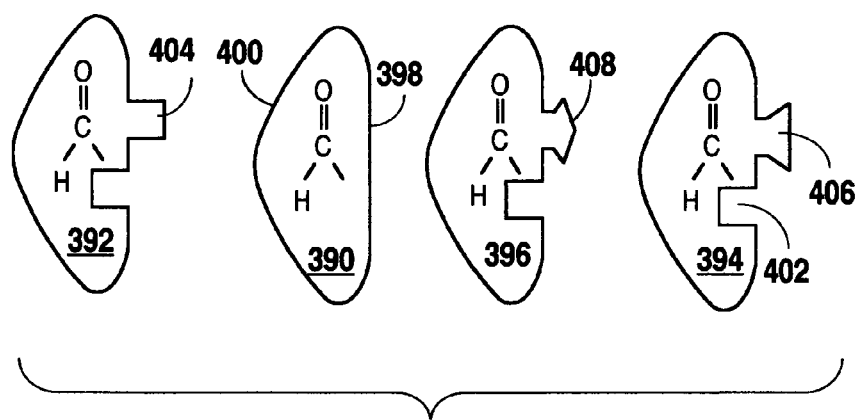
FIG. 9 is a top view of the aldehyde pieces of the present invention.

In FIG. 9 a top view of the aldehyde pieces 390–396 of the present invention is shown. The aldehyde pieces 390–396 have one flat side 398 and one curved hydrogen side 400. One piece 390 is present without concavities and convex tabs and would be bonded to an atom(s) or group(s) that does not cause observable splitting of the NMR peak. The remaining pieces 392–396 contain concavities and convex tabs.

There is one type of concavity 402 present on pieces 392–396. This concavity 402 has preferably three flat sides generally in the shape of a square; however, any shape can be used as long as it is consistent on all aldehyde pieces and the convex tabs of the mating pieces, including, but not limited to, convex tabs 347, 312, 208, 236, 253, 158, 615 and 705. The convex tabs on the aldehyde pieces 392–396 vary depending on the atom(s) or group(s) to which the pieces can be bound.

When the atom(s) or group(s) to which pieces 392–396 can be bound has one hydrogen, the convex tab 404 will preferably have three flat sides generally in the shape of a square; however, any shape can be used as long as it is consistent for the concavity of the mating piece. Piece 392 is capable of binding to a mating piece representing an atom(s) or group(s) with one hydrogen.

If the atom(s) or group(s) to which the piece 392–396 is bound has two hydrogens, the convex tab 406 is preferably shaped as an equilateral triangle; however, any shape can be used as long as it is consistent for the concavity of the mating piece. Piece 394 is capable of binding to a mating piece representing an atom(s) or group(s) with two hydrogens.

In addition, when the atom(s) or group(s) to which the piece 392–396 is bound has three hydrogens, the convex tab 408 is preferably shaped as a diamond; however, any shape can be used as long as it is consistent for the concavity of the mating atom(s) or group(s). Piece 396 can bind to a piece representing an atom(s) or group(s) with three hydrogens.

Figure 10:
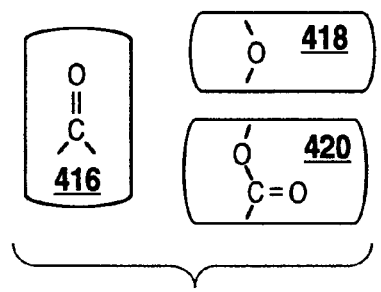
FIG. 10 is a top view of the ketone, ether, and ester pieces of the present invention.

FIG. 10 is a top view of the ketone group pieces 416–420 of the present invention. The ketone group pieces 416–420 include standard ketone piece 416, the ether piece 418, and carboxyl group 420. All ketone group pieces 416–420 are rectangular with two flat sides 417 and two curved ends 419. All pieces are present without concavities and convex tabs. Other pieces that can be included in this group with the same overall characteristics include, but are not limited to, anhydrides, ethers, esters, sulfides, sulfoxides, sulfones, and alkynes.

Figure 11:
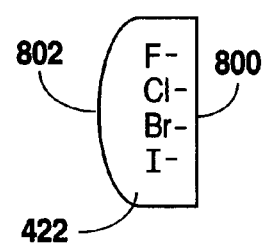
FIG. 11 is a top view of the halide piece of the present invention.

In FIG. 11 a top view of the halide piece 422 of the present invention is shown. Piece 422 has one bonding side 800 and one curved side 802. This piece 422 is present without concavities and convex tabs since the halides do not cause observable splitting of the NMR peak. Other pieces that can be included in this group with the same overall characteristics include, but are not limited to, pieces for cyano and azide groups (not shown).

Figures 12, 13:
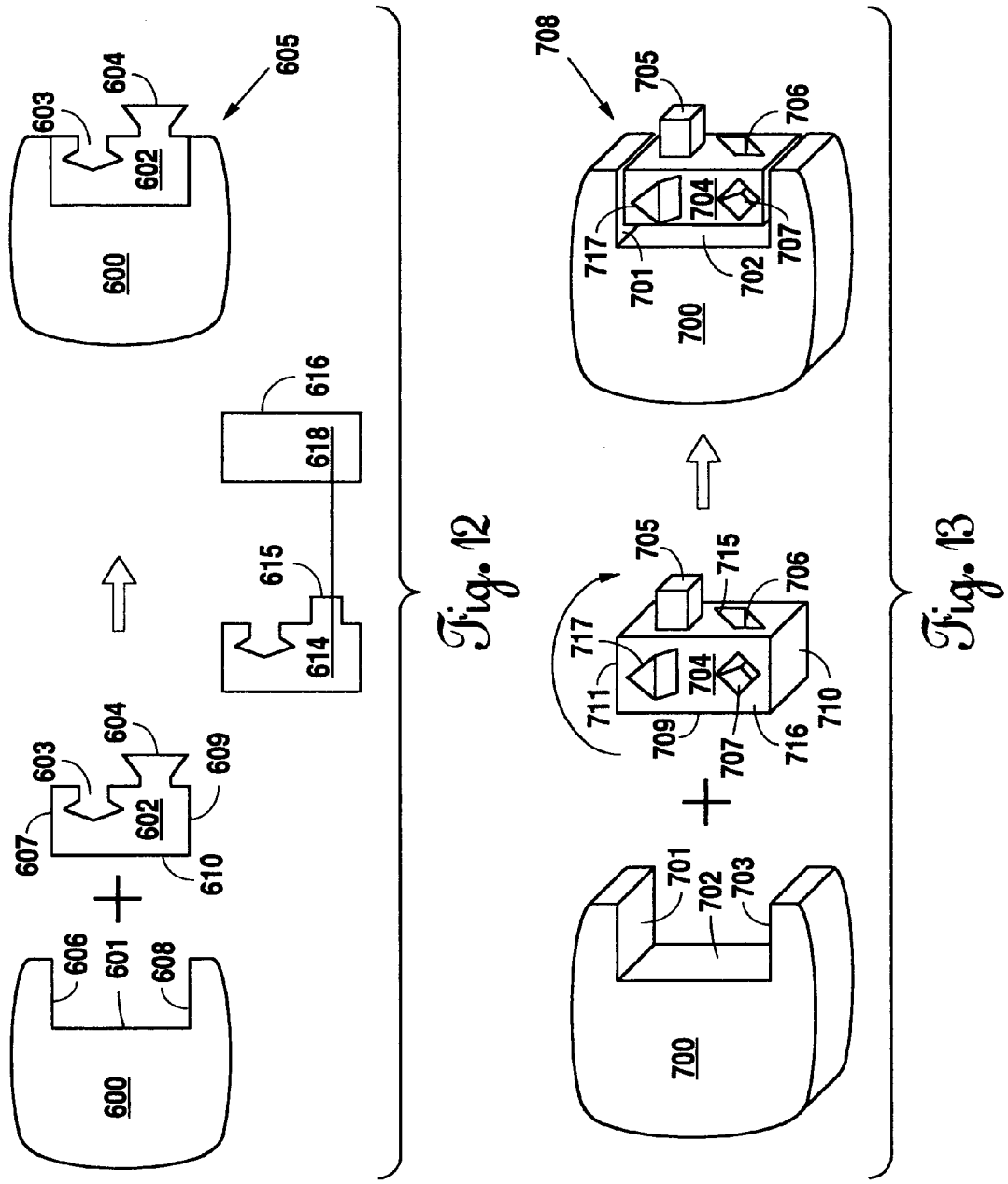
FIG. 12 is a top view of another embodiment of the present invention showing a base methyl piece with interchangeable tabs.
FIG. 13 is a perspective view of another embodiment of the present invention showing a base methyl piece with a single rotating tab member.

FIG. 12 is a top view of a base methyl piece 600 of another embodiment of the present invention with interchangeable tabs 602, 614 and 618. Base methyl piece 600 has a cavity defined by portions 601, 606, and 608. This cavity is designed to accept interchangeable tabs 602, 614 and 618 allowing a snug fit of portions 610, 607, and 609 of interchangeable tabs 602, 614 and 618 against portions 601, 606, and 608 of base methyl piece 600 respectively to form the final piece 605. A locking mechanism (not shown) may also be provided.

Final piece 605 could then substitute for piece 220 in the preferred embodiment where interchangeable tab 602 has a diamond shaped concavity 603 and triangular shaped convex tab 604. Any other shape can be substituted for the concavity 603 and convex tab 604 on interchangeable tab 602 as long as the concavity 603 is consistent for all methyl pieces and the convex tab 604 is consistent for the concavity of the mating piece.

Where final piece 605 incorporates interchangeable tab 618 having a flat bonding side 616, it could substitute for piece 216 in the preferred embodiment.

Final piece 605 could also substitute for piece 218 in the preferred embodiment where interchangeable tab 614 is used having a diamond shaped concavity 603 and a square convex tab 615. Any shape can be substituted for the concavity 603 and the convex tab 615 on interchangeable tab 614 as long as the concavity 603 is consistent for all methyl pieces and the convex tab 615 is consistent for the concavity of the mating piece.

For purposes of this example, the base piece was selected as a methyl piece; however, any other disclosed piece could be substituted as the base piece with one or more cavities defined by portions 601, 606, and 608 that can accept interchangeable tabs defined by the respective concavities and convex tabs provided on the disclosed pieces herein.

FIG. 13 is a perspective view of another embodiment of the present invention showing a base methyl piece 700 with a single rotating tab member 704. Base methyl piece 700 has a cavity defined by portions 701, 702, and 703. This cavity accommodates rotating tab member 704 providing for attachment points (not shown) for portion 711 of rotating tab member 704 to attach to portion 701 of base methyl piece 700 and for portion 710 of rotating tab member 704 to attach to portion 703 of base methyl piece 700. Rotating tab member 704 has four sides each defining a different bonding environment for the base methyl piece 700. Where the base methyl piece 704 is to be bonded to an atom(s) or group(s) that does not cause observable splitting of the NMR peak, flat side 709 would be rotated 180 degrees to the outside or exposed bonding edge to form the final piece which could be substituted for piece 216.

Where the base methyl piece 700 is to be bonded to an atom(s) or group(s) that cause observable splitting of the NMR peak and this atom(s) or group(s) has only one hydrogen, such as a methine piece, side 715 of the rotating tab member 704 can then be rotated if necessary (however in FIG. 13 it is already on the exposed bonding edge) to form the final piece which could substitute for piece 218. Here convex tab 705 is square shaped and concavity 706 is diamond shaped. However, any shape can be substituted for the concavity 706 and the convex tab 705 as long as the concavity 706 is consistent for all methyl pieces and the convex tab 705 is consistent for the concavity of the mating piece.

Where the base methyl piece 700 is to be bonded to an atom(s) or group(s) that cause observable splitting of the NMR peak and this atom(s) or group(s) has two hydrogens, such as a methylene piece, side 716 of the rotating tab member 704 can then be rotated 90 degrees to form the final piece which could substitute for piece 220. Here convex tab 717 is triangular shaped and concavity 707 is diamond shaped. However, any shape can be substituted for the concavity 707 and the convex tab 717 as long as the concavity 707 is consistent for all methyl pieces and the convex tab 717 is consistent for the concavity of the mating piece.

The last side (not shown) will be used where the piece is to be bonded to an atom(s) or group(s) that cause observable splitting of the NMR peak and this atom(s) or group(s) has three hydrogens. For the base methyl piece 700 this portion of the rotating tab member 704 will not be included as such a bond would create ethane that is a singlet in the NMR spectrum. For other pieces it is can be included. This last side can be rotated to form the final piece. Here both the concavity and convex tab would be shaped as a diamond. However, any shape could be used as long as the concavity is consistent for all methyl pieces and the convex tab is consistent for the concavity of all mating pieces.

For this example, a methyl piece was used as the base piece; however, any disclosed piece could be substituted as the base piece with one or more cavities defined by portions 701, 702, and 703 that can accept the rotating tab member 704 having one flat side and three sides defined by the respective concavities and convex tabs provided on the pieces disclosed herein. The distance from the end of one convex tab to the end of the opposing convex tab located 180 degrees apart will be no greater than the thickness of the base piece. A gap will be provided between portion 702 of the base piece and the rotating tab member 704 to allow free rotation of the rotating tab member. A locking mechanism (not shown) may be provided.

These pieces described in FIGS. 1–13, along with the tested methodology, simplify NMR structural analysis for students. The students analyze each signal to determine all information present in the spectrum. During this analysis, the students determine each anticipated chemical fragment from the shift on the NMR spectrum based on the standard chemical shifts known for various chemical fragments. In addition, the students determine the splitting from the spectrum to determine the number of hydrogen neighbors that exist for a particular hydrogen or group of equivalent hydrogens. Last in the analysis is integration that gives the students information on the number of hydrogens that a given resonance represents on the NMR spectrum.

The analysis results in the students determining the applicable pieces of the unknown molecule. Once the pieces are known, the pieces can be put together to form the unknown molecule. Due to the interlocking nature of the pieces, the students are not able to manipulate the pieces to force them into a structure that is not consistent with the spectrum information provided. From experiments using the present NMR teaching method and apparatus, students were found to solve NMR structures in half the time compared to students who did not have the present invention. Some examples are illustrative.

EXAMPLE 1

1. $^1$H NMR Spectrum for Unknown Molecule $C_2H_5Br$ is incorporated herein by reference.

2. Using the Present Invention:

Peak integration is 2:3. Peak at 3.4δ is a $CH_2$ (from chemical shift and integration), but is next to an electronegative atom Br due to the chemical shift. Pull the halide chemical fragment piece.

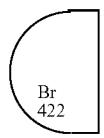

The peak at 3.4δ is also a quartet that indicates there are three adjacent neighbor hydrogens. Pull a $CH_2$ piece that can bind to a group representing three hydrogens, i.e., one having a diamond convex tab.

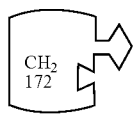

The peak at 1.7 δ is a $CH_3$ (from chemical shift and integration) and the triplet indicates an adjacent two hydrogens. Choose a $CH_3$ piece that can bind to a group representing two hydrogens, i.e., one having a triangular convex tab.

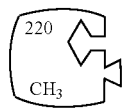

3. Solving for the Unknown Molecule

The pieces may then be put together to form the molecule ethyl bromide $C_2H_5Br$:

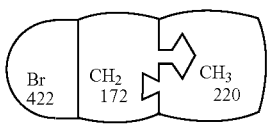

EXAMPLE 2

1. $^1$H NMR Spectrum for Unknown Molecule $C_7H_{14}O_2$ is incorporated herein by reference.

2. Using the Present Invention:

There is a heptet at 5.0 δ having one hydrogen (from integration). Begin to look for a CH piece. The chemical shift indicates this component is next to an oxygen. Chose an oxygen piece. The splitting into the heptet indicates this component is next to six neighbor hydrogens. Choose a CH piece that can bind to six hydrogens i.e. two methyl groups.

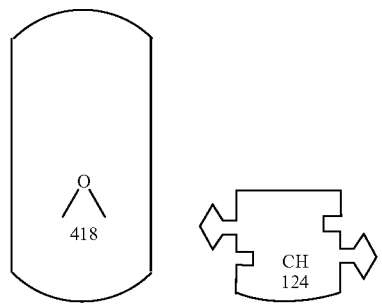

There is a triplet at 2.2δ which has two hydrogens (from integration). Begin looking at the $CH_2$ pieces. The chemical shift indicates this component is next to a carbonyl. Select a ketone piece. The triplet indicates this component is next to two neighbor hydrogens. Select a $CH_2$ piece which can bind to a component having two hydrogens i.e. a piece having the triangular convex tab.

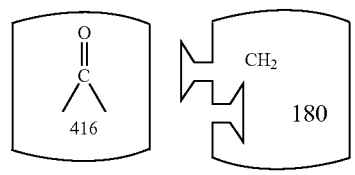

There is a hextet at 1.6δ having two hydrogens (from integration). The chemical shift indicates an alkyl group. The hextet indicates this component is next to five neighbor hydrogens, three on one side, and two on the other. Select the appropriate $CH_2$ piece having a triangular convex tab on one side and a diamond convex tab on the other.

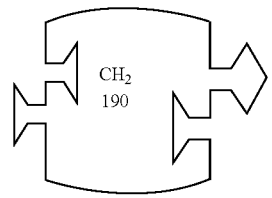

There is a doublet at 1.2δ with six hydrogens (from integration). The chemical shift indicates it is an alkyl group. The doublet indicates it's next to one neighbor hydrogen. This must represent two equivalent $CH_3$ groups (since six hydrogens are involved) each next to a component having one hydrogen i.e. next to a component having a square convex tab. Select two $CH_3$ pieces having a square convex tab.

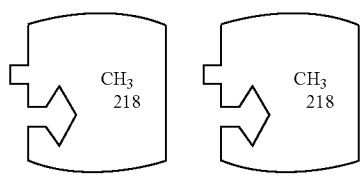

There is a triplet at 0.9δ having three hydrogens (from integration). The chemical shift indicates it's an alkyl group. The triplet indicates this group is next to two neighbor hydrogens. Select a $CH_3$ piece with a triangular convex tab representing the neighboring component with two hydrogens.

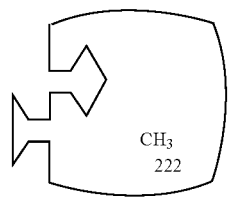

3. Solving for the Unknown Molecule:

Assemble pieces, making sure to use all pieces and take into account chemical shift information. The pieces can be put together to form isopropyl butyrate, $C_7H_{14}O_2$.

There is a doublet at 1.5δ which has three hydrogens. The chemical shift indicates it is an alkyl group while the doublet indicates this group is next to one neighbor hydrogen. Select a $CH_3$ piece that has a square convex tab.

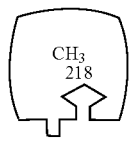

There is a triplet at 1.0δ that has three hydrogens. The chemical shift indicates it is an alkyl group. The triplet indicates that it is next to two neighbor hydrogens. Select a $CH_3$ piece having a triangular convex tab representative of a neighboring component having two hydrogens.

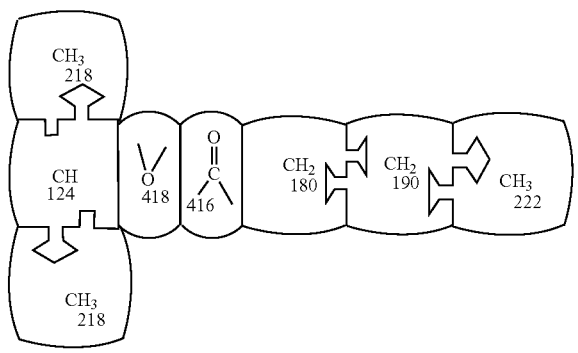

EXAMPLE 3

1. ¹H NMR Spectrum for Unknown Molecule $C_4H_9Cl$ is incorporated herein by reference.

While this spectrum has fewer peaks than EXAMPLE 2, it is frequently more difficult for students due to the complex multiplet signal at 1.75 δ. Students often feel that this makes the spectrum impossible since one cannot determine the number of hydrogens adjacent to this hydrogen.

2. Using the Present Invention:

There is a hextet at 4.0δ that has one hydrogen (from integration). The chemical shift indicates this group is adjacent to an electronegative Cl. Select a Cl piece. The hextet indicates this group is also next to five neighbor hydrogens. Select a CH piece that can bind to five hydrogens i.e. a CH piece having two different convex tabs-one that can bind to two hydrogens (triangular convex tab) and one that can bind to three hydrogens (diamond convex tab).

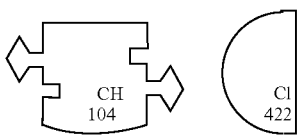

There is a multiplet at 1.75δ that has two hydrogens (from integration). Begin looking at the alkyl $CH_2$ pieces, but at this point one cannot tell about the neighbor hydrogens other than there are several.

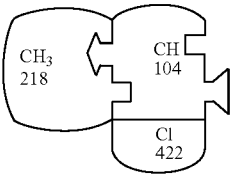

3. Solving for the Unknown Molecule:

Put the known pieces together. Notice that once the known pieces are assembled the undetermined $CH_2$ piece is obvious from the neighbor pieces which must bond to it as follows:

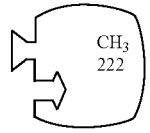

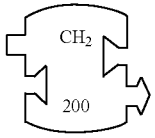

Undetermined CH₂ piece

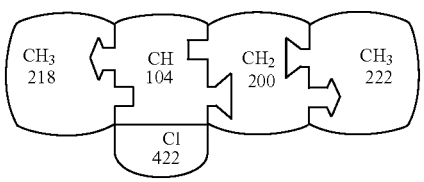

The final structure is therefore determined to be sec-butyl chloride, C₄H₉Cl.

EXAMPLE 4

1. ¹H NMR Spectrum for Unknown Molecule $C_{13}H_{16}O_3$ is incorporated herein by reference.

This spectrum is very complex. Such spectra are typically solved along with Infrared Spectra which help determine which chemical fragments are present in the molecule. This molecule is extremely difficult to identify using the "look, see, guess" method in which students solve the spectrum by guessing chemical structures. Using this approach there are two recognizable groups: a di-substituted aromatic ring at 6.8–7.8δ, and an isolated ethyl group at 2.5δ, 1.0δ. Further analysis using the present invention, however, demonstrates that the quartet/triplet pattern of the ethyl group is in fact not correct. This molecule has no isolated ethyl group. Such misidentifications using the "look, see, guess" method are a common occurrence in complex spectra such as this and make the "look, see, guess" method a very poor approach for solving complex spectra.

2. Using the Present Invention:

Initial analysis of the NMR and IR data are similar in both existing methods and the method of the present invention. The band at 10.8 δ could be either a carboxylic acid or phenol. Analysis of the liquid thin film infrared spectrum indicates it is a phenol due to the lack of extensive OH hydrogen bonding at 2500–3300 cm⁻¹.

Acyclic alkanes have the general formula $C_nH_{2n+2}$ while cyclic alkanes and alkenes have the generally formula $C_nH_{2n}$. The degree of unsaturation of the molecule is calculated by determining the number of hydrogens for the corresponding saturated alkane and subtracting the number of hydrogens actually present and dividing by two. The present molecule has thirteen carbons so the number of hydrogens for the corresponding saturated alkane would be (2n+2) or 28. Oxygen atoms are ignored. Subtracting out the number of hydrogens actually present (16) means there are twelve hydrogens missing compared to a totally saturated molecules.

The degree of unsaturation is determined by dividing this number by two. This indicates there are 12/2=6 double bonds and/or rings in the molecule. The NMR and IR indicate the presence of an aromatic ring (4 unsaturations), a carbonyl group (1 unsaturation); thus the two alkene hydrogens observed in the NMR must be on a single double bond (1 unsaturation). Finally the combination of three oxygens in the molecule, the presence of a phenol and carbonyl (IR at 1680 cm⁻¹) and the strong IR bands at 1200–1300 cm⁻¹ indicate that the molecule contains an ester functionality. Select the ester piece 420.

2. Using the Present Invention:

There is a singlet at 10.8 δ with one hydrogen (from integration). This is due to a carboxylic acid or alcohol (phenol). Analysis of the liquid thin film infrared spectrum indicates it is a phenol due to the lack of extensive OH hydrogen bonding at 2500–3300 cm⁻¹. Select an OH piece.

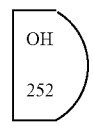

There is a doublet at 7.8δ with one hydrogen (from integration). This is an aromatic hydrogen with one neighbor hydrogen. Select an aromatic piece having one neighbor hydrogen i.e. having one triangular concavity and one triangular convex tab.

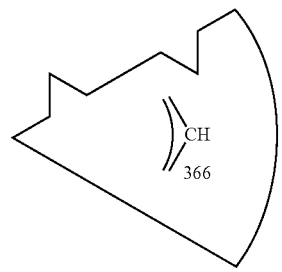

There is a triplet at 7.4δ with one hydrogen (from integration). This is an aromatic hydrogen with two neighbor hydrogens. Select an aromatic piece with two sets of triangular concavities and convex tabs.

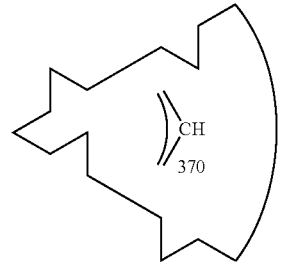

There is a doublet at 7.0δ with one hydrogen (from integration). This is another aromatic hydrogen with one neighbor hydrogen. Select another aromatic piece with one triangular concavity and one triangular convex tab.

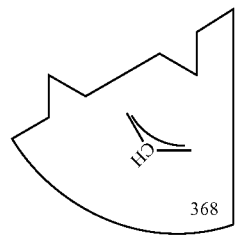

There is a triplet at 6.8δ with one hydrogen (from integration). This is another aromatic hydrogen with two neigh bor hydrogens. Select an aromatic piece with two sets of triangular concavities and convex tabs.

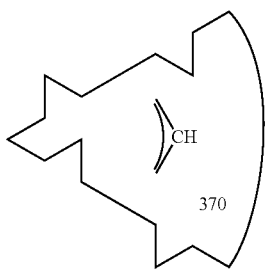

The presence of only four aromatic hydrogens indicates that there are two aromatic carbons without any attached hydrogens. The pieces below represent such pieces.

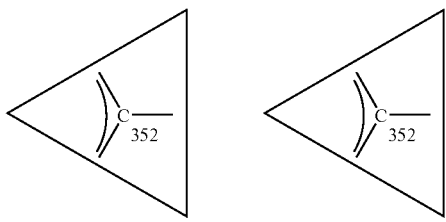

There is a quartet at 5.6δ with long range splitting having one hydrogen. This is an alkene hydrogen with three neighbor hydrogens. Since there are two alkene hydrogens (see the 5.4δ peak) and a single alkene double bond, this must be a di-substituted alkene connected to a $CH_2$ group. The piece below represents such a piece.

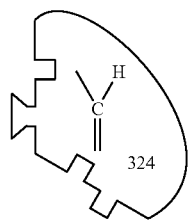

There is a quartet at 5.4δ with long range splitting having one hydrogen. This is an alkene hydrogen with three neighbor hydrogens. Since there are two alkene hydrogens (see the 5.6δ peak) and a single alkene double bond, this must be a di-substituted alkene connected to a $CH_2$ group. The piece below represents such a piece.

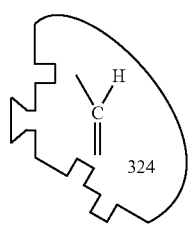

There is a triplet at 4.3δ with two hydrogens (from integration). The chemical shift indicates that these two hydrogens are adjacent to an oxygen. The triplet splitting indicates this group has two neighbor hydrogens. Select a $CH_2$ piece with a triangular convex tab for connection to a piece having two hydrogens.

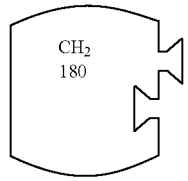

There is a quartet at 2.5δ having two hydrogens (from integration). The chemical shift indicates that these two hydrogens are adjacent to a carbonyl or alkene. The quartet splitting indicates this group is next to three neighbor hydrogens. Select a $CH_2$ piece having a diamond convex tab for connection to a piece having three hydrogens.

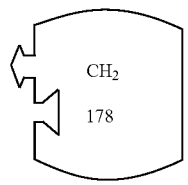

There is a pentet at 2.1δ having two hydrogens (from integration). The chemical shift indicates that these two hydrogens are adjacent to a carbonyl or alkene. The pentet indicates that the present group is next to four neighbor hydrogens. Since there are four neighbor hydrogens, it is impossible for the group to be next to a carbonyl, so it must be next to the alkene. Select a $CH_2$ piece having a square convex tab for connection to a piece having one hydrogen and a diamond convex tab for connection to a piece having three hydrogens.

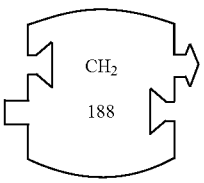

There is a triplet at 1.0δ having three hydrogens (from integration). The chemical shift indicates these three hydrogens are on an alkyl group. The triplet indicates that this component has two neighbor hydrogens. Select a $CH_3$ piece having a triangular convex tab representative of a component having two hydrogens.

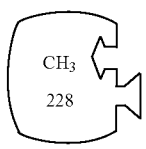

3. Solving for the Unknown Molecule:

a) Aromatic ring:

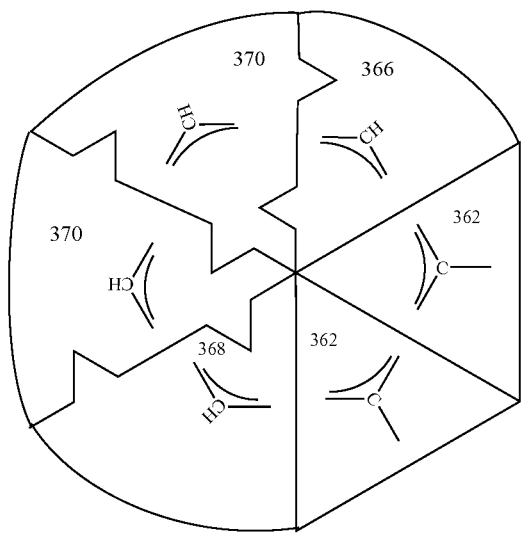

Figure 14B:
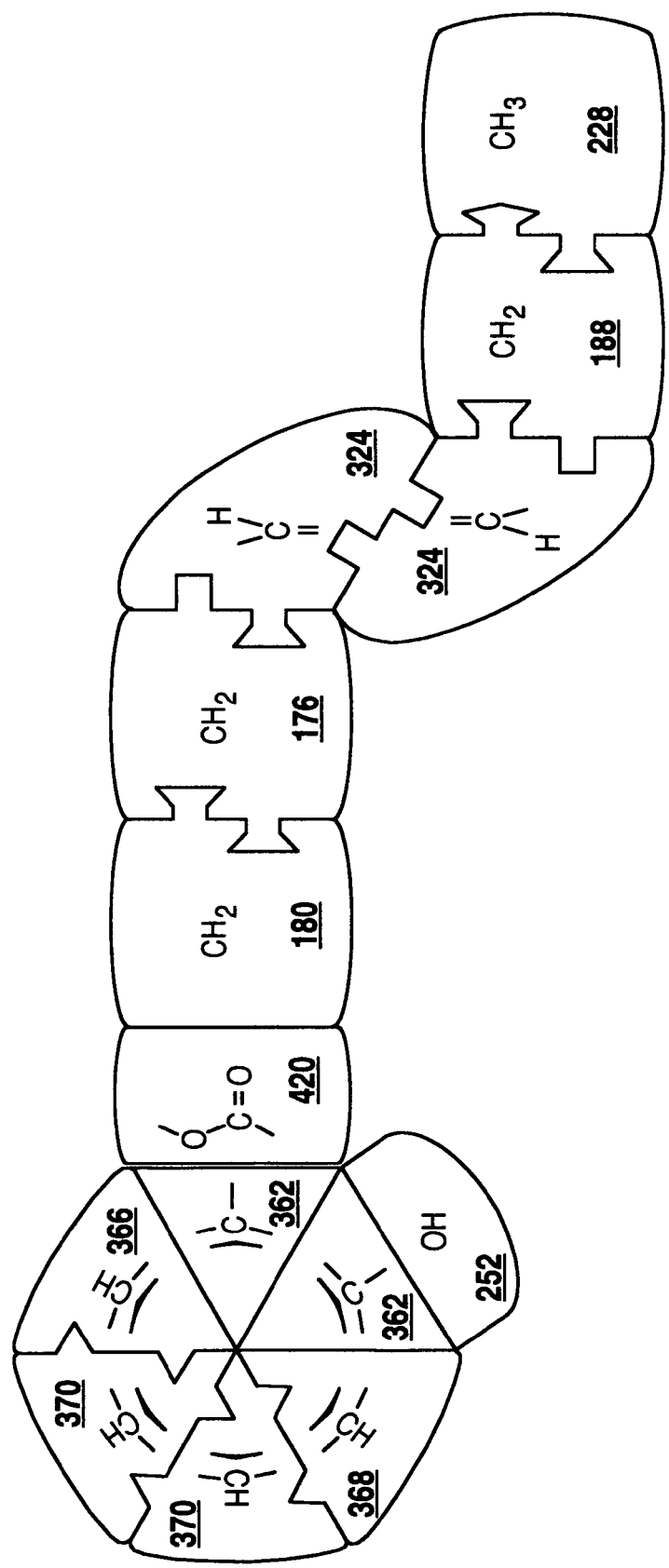
FIG. 14B is a perspective view of the preferred embodiment of the present invention used to make a second attempt at constructing a molecule.

There are problems in the first attempt to put the molecule together. See FIG. 14A. There are two pieces which can bond to the piece 228 and no part to connect the alkene and aromatic chemical fragments. This indicates that the splitting has been misinterpreted. There is not an isolated ethyl group. The methylene quartet at 2.5 δ must not be adjacent to a methyl, but rather two hydrogens on one side and a single hydrogen on the other. Replacement of piece 178 with piece 176 allows completion of the molecule. See FIG. 14B.

In order to provide a more compact NMR teaching method and apparatus, a second embodiment was designed. Each piece of the second embodiment of the present invention has the number of sides corresponding to the number of bonds present around the central atom. Bonds to hydrogen are preferably curved, but can be any shape that indicates no further pieces bind to that respective side. Bonding sides are flat with bonding indicators. No bonding indicators are present on the curved hydrogen sides. Each side of the pieces is the same length unless otherwise indicated.

The presence of first bonding indicators on the bonding sides indicates bonding of the respective piece to a mating piece that does not cause splitting of the NMR peak. The presence of second bonding indicators on the bonding sides indicates bonding of the respective piece to a mating piece that causes splitting of the NMR peak. Indicia are provided on the face of the pieces to identify the respective piece while the color of the bonding indicator is indicative of the color of the mating piece.

Figure 15:
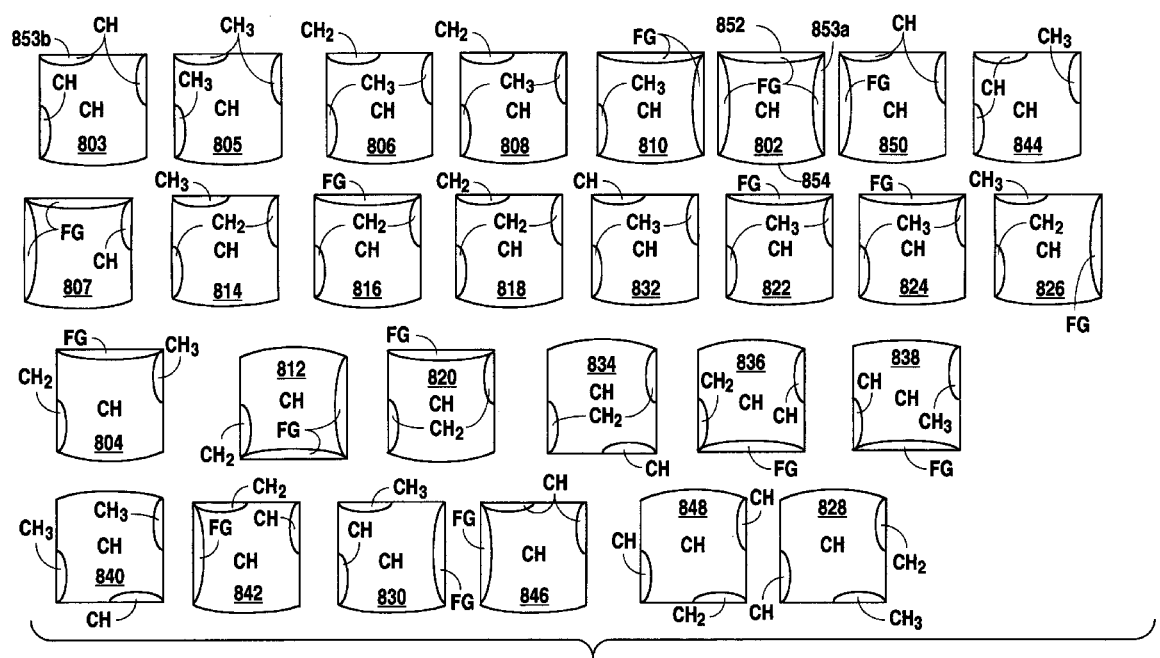
FIG. 15 is a top view of the methine CH pieces of the second embodiment of the present invention.

FIG. 15 is a top view of the methine CH pieces 802–850 of the second embodiment of the present invention. These pieces have three bonding sides 852 and one curved hydrogen side 854. The pieces 802–850 are present having indicia thereon to identify the respective pieces. One piece 802 has three first bonding indicators 853a. The first bonding indicators 853a are preferably semi-elliptical and are shown with the indicia "FG" to indicate bonding to an atom or group that does not cause observable splitting of the NMR peak. While the first bonding indicators 853a are preferably semi-elliptical, any shape is possible. The first bonding indicator 853a is also color-coded and can be any color as long as it matches the color of the mating piece.

The remaining pieces 803–850 contain exclusively second bonding indicators 853b or a combination of first bonding indicators 853a and second bonding indicators 853b. The second bonding indicators 853b are preferably hemispherical and are shown with the indicia "CH", "CH$_2$" or "CH$_3$" to indicate bonding to the respective group that causes observable splitting of the NMR peak. While the second bonding indicators 853b are preferably hemispherical, any shape is possible. The second bonding indicator 853b is also color-coded and can be any color as long as it matches the color of the mating piece.

Pieces 803, 807, and 828–850 are capable of being bound to a mating piece representing a group having one hydrogen, such as another methine piece 803–850. Pieces 807 and 828–842 are capable of binding to only one mating piece representing a group having one hydrogen; however, pieces 844–850 are capable of binding to two mating pieces representing a group having one hydrogen. Piece 803 can bind three mating pieces representing a group having one hydrogen. Pieces 804, 806, 808, 812, 814, 816, 818, 820, 826, 828, 834, 836, 842, and 848 are capable of being bound to at least one mating piece representing a group having two hydrogens. Pieces 804, 806, 808, 812, 826, 828, 836, 842, and 848 are capable of binding to only one mating piece representing a group having two hydrogens. Pieces 814, 816, 820, and 834 can bind to as many as two mating pieces representing a group having two hydrogens while piece 818 can bind to three mating pieces representing a group having two hydrogens.

Pieces 804, 805, 806, 808, 810, 814, 822, 824, 826, 828, 830, 832, 838, 840, and 844 are capable of binding to mating pieces representing a group having three hydrogens. Pieces 804, 810, 814, 826, 828, 830, 838, and 844 can bind to one mating piece representing a group having three hydrogens while pieces 806, 808, 822, 824, 832, and 840 are capable of binding to as many as two mating pieces representing a group having three hydrogens. Piece 805 can bind to three mating pieces representing a group having three hydrogens.

Table 7 illustrates the number of variations possible for the methine pieces 802–850.

TABLE 7

Methine Piece of Second Embodiment

| Piece Number | Number of Flat Sides with no second bonding indicators | Number of Flat Sides with methine second bonding indicator | Number of Flat Sides with methylene second bonding indicator | Number of Flat Sides with methyl second bonding indicator |
|---|---|---|---|---|
| 802 | 3 | 0 | 0 | 0 |
| 807 | 2 | 1 | 0 | 0 |
| 812 | 2 | 0 | 1 | 0 |
| 810 | 2 | 0 | 0 | 1 |
| 850/846 | 1 | 2 | 0 | 0 |
| 816/820 | 1 | 0 | 2 | 0 |
| 824/822 | 1 | 0 | 0 | 2 |
| 836/842 | 1 | 1 | 1 | 0 |
| 838/830 | 1 | 1 | 0 | 1 |
| 826/804 | 1 | 0 | 1 | 1 |
| 803 | 0 | 3 | 0 | 0 |
| 818 | 0 | 0 | 3 | 0 |
| 805 | 0 | 0 | 0 | 3 |
| 828 | 0 | 1 | 1 | 1 |
| 848 | 0 | 2 | 1 | 0 |
| 844 | 0 | 2 | 0 | 1 |
| 834 | 0 | 1 | 2 | 0 |
| 832/840 | 0 | 1 | 0 | 2 |
| 806/808 | 0 | 0 | 1 | 2 |
| 814 | 0 | 0 | 2 | 1 |

Figure 16:
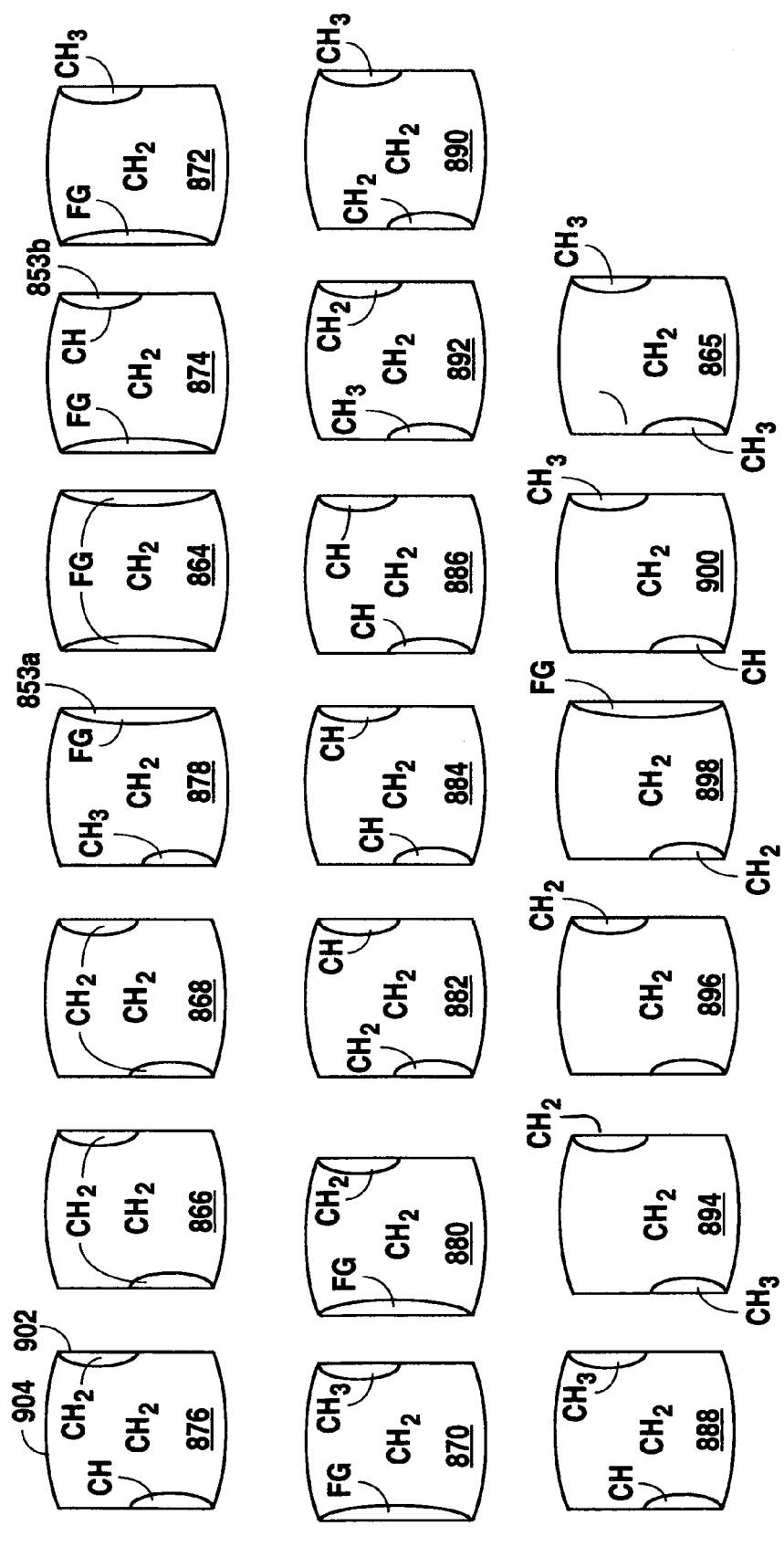
FIG. 16 is a top view of the methylene $CH_2$ pieces of the second embodiment of the present invention.

FIG. 16 is a top view of the methylene CH$_2$ pieces 864–900 of the second embodiment of the present invention. These pieces have two bonding sides 902 and two curved hydrogen sides 904. The pieces 864–900 are present having indicia thereon to identify the respective pieces. One piece 864 has two first bonding indicators 853a. The first bonding indicators 853a are again preferably semi-elliptical and are show with the indicia "FG" to indicate bonding to an atom or group that does not cause observable splitting of the NMR peak. While the first bonding indicators 853a are preferably semi-elliptical any shape is possible. The first bonding indicator 853a is also color-coded and can be any color as long as it matches the color of the mating piece.

The remaining pieces 865–900 contain exclusively second bonding indicators 853b or a combination of first bonding indicators 853a and second bonding indicators 853b. The second bonding indicators 853b are preferably hemispherical and are shown with the indicia "CH", "CH$_2$", "CH$_3$" to indicate bonding to the respective group that causes observable splitting of the NMR peak. While the second bonding indicators 853b are preferably hemispherical, any shape is possible. The second bonding indicator 853b is also color-coded and can be any color as long as it matches the color of the mating piece.

Pieces 874, 876, 882, 888, and 900 can bind to a mating piece representing an atom(s) or group(s) having one hydrogen while pieces 884 and 886 are capable of binding two mating pieces representing an atom(s) or group(s) having one hydrogen.

Pieces 866, 868, 876, 880, 882, 890, 892, 894, 896, and 898 are capable of binding to at least one mating piece representing a group having two hydrogens. Pieces 876, 880, 882, 890, 892, 894, and 898 can bind only one mating piece representing a group having two hydrogens while pieces 866, 868, and 896 can bind as many as two mating pieces representing a group having two hydrogens.

Pieces 870, 872, 878, 888, 890, 892, 894, and 900 can bind to mating pieces representing a group having three hydrogens and can bind to these mating pieces in one location. Piece 865 can bind to a mating piece representing a group having three hydrogens in two locations.

Table 8 illustrates the number of variations possible for the methylene pieces 864–900.

TABLE 8

Methylene Piece of Second Embodiment

| Piece Number | Number of Flat Sides with no second bonding indicators | Number of Flat Sides with methine second bonding indicator | Number of Flat Sides with methylene second bonding indicator | Number of Flat Sides with methyl second bonding indicator |
|---|---|---|---|---|
| 864 | 2 | 0 | 0 | 0 |
| 874 | 1 | 1 | 0 | 0 |
| 880/898 | 1 | 0 | 1 | 0 |
| 878/872/970 | 1 | 0 | 0 | 1 |
| 886/884 | 0 | 2 | 0 | 0 |
| 866/896/868 | 0 | 0 | 2 | 0 |
| 865 | 0 | 0 | 0 | 2 |
| 876/882 | 0 | 1 | 1 | 0 |
| 888/900 | 0 | 1 | 0 | 1 |
| 892/890/894 | 0 | 0 | 1 | 1 |

FIG. 17 is a top view of the methyl pieces CH$_3$ 914–928 of the second embodiment of the present invention. These pieces have one bonding side 930 and three curved hydrogen sides 932. The pieces 914–928 are present with indicia thereon to identify the respective pieces. Two pieces 914 and 916 have one first bonding indicator 853a. The first bonding indicator 853a is preferably semi-elliptical and is shown with the indicia "FG" to indicate bonding to an atom or group that does not cause observable splitting of the NMR peak. While the first bonding indicators 853a are preferably semi-elliptical, any shape is possible. The first bonding indicator 853a is also color-coded and can be any color as long as it matches the color of the mating piece.

The remaining pieces 918–928 contain exclusively either a first bonding indicator 853a or a second bonding indicator 853b. The second bonding indicators 853b are preferably hemispherical and are shown with the indicia "CH", "CHu", or "CHu" to indicate bonding to the respective group that causes observable splitting of the NMR peak. While the second bonding indicators 853b are preferably hemispherical, any shape is possible. The second bonding indicator 853b is also color-coded and can be any color as long as it matches the color of the mating piece.

Piece 918 is capable of binding to one mating piece representing a group having one hydrogen. Pieces 920–928 are capable of binding to one mating piece representing a group having two hydrogens. A methyl piece that can bind to a mating piece representing a group having three hydrogens is not present in the invention as it represents ethane that gives a singlet on the NMR spectrum.

Table 9 illustrates the number of variations possible for the methyl pieces 914–928 of the second embodiment.

TABLE 9

Methyl Piece of Second Embodiment

| Piece Number | Number of Flat Sides with No Second Bonding Indicators | Number of Flat Sides with Methine Second Bonding Indicator | Number of Flat Sides with Methylene Second Bonding Indicator | Number of Flat Sides with Methyl Second Bonding Indicator |
|---|---|---|---|---|
| 914/916 | 1 | 0 | 0 | 0 |
| 918 | 0 | 1 | 0 | 0 |
| 920/924/922/928 | 0 | 0 | 1 | 0 |

FIG. 18 is a top view of the quaternary carbon piece 950 of the second embodiment of the present invention. This piece has four flat bonding sides 951 and is present with indicia thereon to identify the piece. First bonding indicators 853a are shown being preferably semi-elliptical and with indicia "FG" to indicate bonding to an atom or group that does not cause observable splitting of the NMR peak. While the first bonding indicators 853a are preferably semi-elliptical, any shape is possible. The first bonding indicator 853a is also color-coded and can be any color as long as it matches the color of the mating piece.

FIG. 19 is a top view of the alcohol and thiol group pieces 952–958 of the second embodiment of the present invention. These pieces have one bonding side 955 with the remainder of the piece being preferably rounded; however, any shape is possible for this remainder side as long as it is shaped so that no other connections are possible. The pieces are present with indicia thereon to identify the respective pieces. One piece 952 has one first bonding indicator 853a. The first bonding indicator 853a is preferably semi-elliptical and is shown with the indicia "FG" to indicate bonding to an atom or group that does not cause observable splitting of the NMR peak. While the first bonding indicators 853a are preferably semi-elliptical, any shape is possible. The first bonding indicator 853a is also color-coded and can be any color as long as it matches the color of the mating piece.

The remaining pieces 954–958 contain exclusively second bonding indicators 853b. The second bonding indicators 853b are preferably hemispherical and are shown with the indicia "CH" (954), "CH$_2$" (956), or "CH$_3$" (958) to indicate bonding to the respective group that causes observable splitting of the NMR peak. While the second bonding indicators 853b are preferably hemispherical, any shape is possible. The second bonding indicator 853b is also color-coded and can be any color as long as it matches the color of the mating piece.

Figure 20:
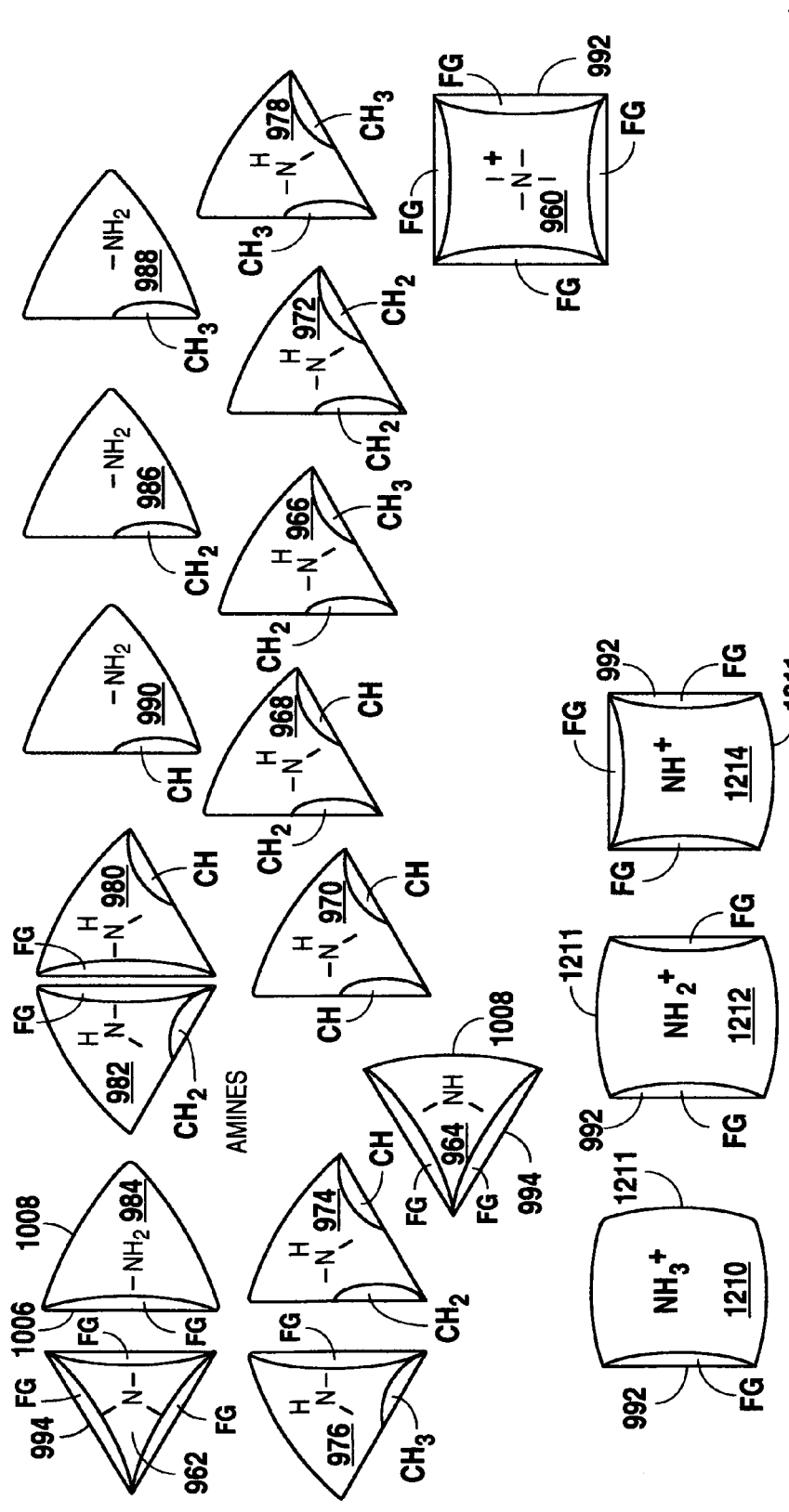
FIG. 20 is a top view of the amine pieces of the second embodiment of the present invention.

FIG. 20 is a top view of the amine pieces 960–990, 1210, 1212, and 1214 of the second embodiment of the present invention. These pieces are present with indicia thereon to identify the respective pieces. The quaternary amines are pieces 960, 1210, 1212, and 1214. Piece 960 has four bonding sides 992. Piece 1210 has one bonding side 992 and three curved hydrogen sides 1211. Piece 1210 has one first bonding indicator 853a. The first bonding indicator 853a is preferably semi-elliptical and is shown with the indicia "FG" to indicate bonding to an atom or group that does not cause observable splitting of the NMR peak. While the first bonding indicators 853a are preferably semi-elliptical, any shape is possible. The first bonding indicator 853a is also color-coded and can be any color as long as it matches the color of the mating piece.

Piece 1210 can be modified to contain exclusively second bonding indicators 853b such as those shown for the methyl pieces on bonding side 992. The second bonding indicators 853b are preferably hemispherical and would include the indicia "CH", "CH$_2$", or "CH$_3$" to indicate the bonding to the respective group that causes observable splitting of the NMR peak. While the second bonding indicators 853b are preferably hemispherical, any shape is possible. The second bonding indicator 853b is also color-coded and can be any color as long as it matches the color of the mating piece.

For piece 1212 there are two bonding sides 992 and two curved hydrogen sides 1211. This piece has two first bonding indicators 853a. The first bonding indicators 853a are preferably semi-elliptical and are shown with the indicia "FG" to indicate bonding to an atom or group that does not cause observable splitting of the NMR peak. While the first bonding indicators 853a are preferably semi-elliptical, any shape is possible. The first bonding indicator 853a is also color-coded and can be any color as long as it matches the color of the mating piece.

Piece 1212 can be modified to contain exclusively second bonding indicators 853b or a combination of first bonding indicators 853a and second bonding indicators 853b such as those shown for the methylene pieces on bonding sides 992. The second bonding indicators 853b are preferably hemispherical and would include the indicia "CH", "CH2", or "CH3" to indicate the bonding to the respective group that causes observable splitting of the NMR peak. While the second bonding indicators 853b are preferably hemispherical, any shape is possible. The second bonding indicator 853b is also color-coded and can be any color as long as it matches the color of the mating piece.

Piece 1214 has three bonding sides 992 and one curved hydrogen side 1212. The piece has three first bonding indicators 853a. The first bonding indicators 853a are preferably semi-elliptical and are shown with the indicia "FG" to indicate bonding to an atom or group that does not cause observable splitting of the NMR peak. While the first bonding indicators 853a are preferably semi-elliptical, any shape is possible. The first bonding indicator 853a is also color-coded and can be any color as long as it matches the color of the mating piece.

Piece 1214 can be modified to contain exclusively second bonding indicators 853b or a combination of first bonding indicators 853a and second bonding indicators 853b such as those shown for the methine pieces on bonding sides 992. The second bonding indicators 853b are preferably hemispherical and would include the indicia "CH", "CH2", or "CH3" to indicate the bonding to the respective group that causes observable splitting of the NMR peak. While the second bonding indicators 853b are preferably hemispherical, any shape is possible. The second bonding indicator 853b is also color-coded and can be any color as long as it matches the color of the mating piece.

The remaining amine pieces 962–990 have three sides and have the basic shape of an equilateral triangle. Piece 962, representative of the tertiary amine, has three bonding sides 994. The piece has three first bonding indicators 853a. The first bonding indicators 853a are preferably semi-elliptical and are shown with the indicia "FG" to indicate bonding to an atom or group that does not cause observable splitting of the NMR peak. While the first bonding indicators 853a are preferably semi-elliptical, any shape is possible. The first bonding indicator 853a is also color-coded and can be any color as long as it matches the color of the mating piece. Generally, piece 962 would be bonded to another piece with a similar flat side since this nitrogen has no hydrogen to split its neighbor group.

Pieces 964–982, representative of secondary amines, contain two bonding sides 994 and one curved hydrogen side 1008. Piece 964 has first bonding indicators 853a on its bonding sides. The first bonding indicators 853a are preferably semi-elliptical and are shown with the indicia "FG" to indicate bonding to an atom or group that does not cause observable splitting of the NMR peak. While the first bonding indicators 853a are preferably semi-elliptical, any shape is possible. The first bonding indicator 853a is also color-coded and can be any color as long as it matches the color of the mating piece.

The remaining pieces 966–982 contain exclusively second bonding indicators 853b or a combination of first bonding indicators 853a and second bonding indicators 853b. The second bonding indicators 853b are preferably hemispherical and are shown with the indicia "CH", "CH$_2$", or "CH$_3$" to indicate bonding to the respective group that causes observable splitting of the NMR peak. While the second bonding indicators 853b are preferably hemispherical, any shape is possible. The second bonding indicator 853b is also color-coded and can be any color as long as it matches the color of the mating piece.

Pieces 968, 970, 974, and 980 are all capable of binding to a piece representing atom(s) or group(s) with one hydrogen. Pieces 968, 974, and 980 can bind only one piece representing atom(s) or group(s) with one hydrogen; whereas piece 970 can bond to two such pieces.

Pieces 966, 972, 974, and 982 are capable of binding to a piece representing atom(s) or group(s) with two hydrogens. Pieces 966, 974, and 982 are capable of bonding to only one piece representing atom(s) or group(s) with two hydrogens with piece 972 capable of binding to two such pieces.

Pieces 966, 968, and 976 are capable of bonding to only one piece representing atom(s) or group(s) with three hydrogens and piece 978 is capable of bonding two such pieces.

Table 10 illustrates the number of variations possible for the secondary amine pieces of the second embodiment.

TABLE 10

Secondary Amines of the Second Embodiment

| Piece Number | Number of Flat Sides with No Second Bonding Indicators | Number of Flat Sides with Methine Second Bonding Indicator | Number of Flat Sides with Methylene Second Bonding Indicator | Number of Flat Sides with Methyl Second Bonding Indicator |
|---|---|---|---|---|
| 964 | 2 | 0 | 0 | 0 |
| 980 | 1 | 1 | 0 | 0 |
| 982 | 1 | 0 | 1 | 0 |
| 976 | 1 | 0 | 0 | 1 |
| 970 | 0 | 2 | 0 | 0 |
| 972 | 0 | 0 | 2 | 0 |
| 978 | 0 | 0 | 0 | 2 |
| 974 | 0 | 1 | 1 | 0 |
| 968 | 0 | 1 | 0 | 1 |
| 966 | 0 | 0 | 1 | 1 |

Pieces 984–990, representing primary amines, have one bonding side 1006 and two curved hydrogen sides 1008. One piece 984 has one first bonding indicator 853a. The first bonding indicator 853a is preferably semi-elliptical and is shown with the indicia "FG" to indicate bonding to an atom or group that does not cause observable splitting of the NMR peak. While the first bonding indicators 853a are preferably semi-elliptical, any shape is possible. The first bonding indicator 853a is also color-coded and can be any color as long as it matches the color of the mating piece.

The remaining pieces 986–990 contain exclusively either a first bonding indicator 853a or a second bonding indicator 853b. The second bonding indicators 853b are preferably hemispherical and are shown with the indicia "CH", "CH$_2$", or "CH$_3$" to indicate bonding to the respective group that causes observable splitting of the NMR peak. While the second bonding indicators 853b are preferably hemispherical, any shape is possible. The second bonding indicator 853b is also color-coded and can be any color as long as it matches the color of the mating piece.

Piece 990 is designed to bind to a pieces representing atom(s) or group(s) having one splitting hydrogen whereas piece 986 is designed to bind to a piece representing atom(s) or group(s) having two splitting hydrogens. The remaining piece 988 is designed to bond to a piece representing atom(s) or group(s) having three hydrogens. Table 11 illustrates the number of variations possible for these primary amines.

TABLE 11

Primary Amines of Second Embodiment

| Piece Number | Number of Flat Sides with No Second Bonding Indicators | Number of Flat Sides with Methine Second Bonding Indicator | Number of Flat Sides with Methylene Second Bonding Indicator | Number of Flat Sides with Methyl Second Bonding Indicator |
|---|---|---|---|---|
| 984 | 1 | 0 | 0 | 0 |
| 990 | 0 | 1 | 0 | 0 |
| 986 | 0 | 0 | 1 | 0 |
| 988 | 0 | 0 | 0 | 1 |

The use of first and second bonding indicators 853a and 853b along with color-coding these bonding indicators as described in FIGS. 15–20 is not to be construed as limited to those chemical groups described, but can be applied to each of the groups described in the preferred embodiment as well as those groups obvious to individuals skilled in the art.

Figure 21:
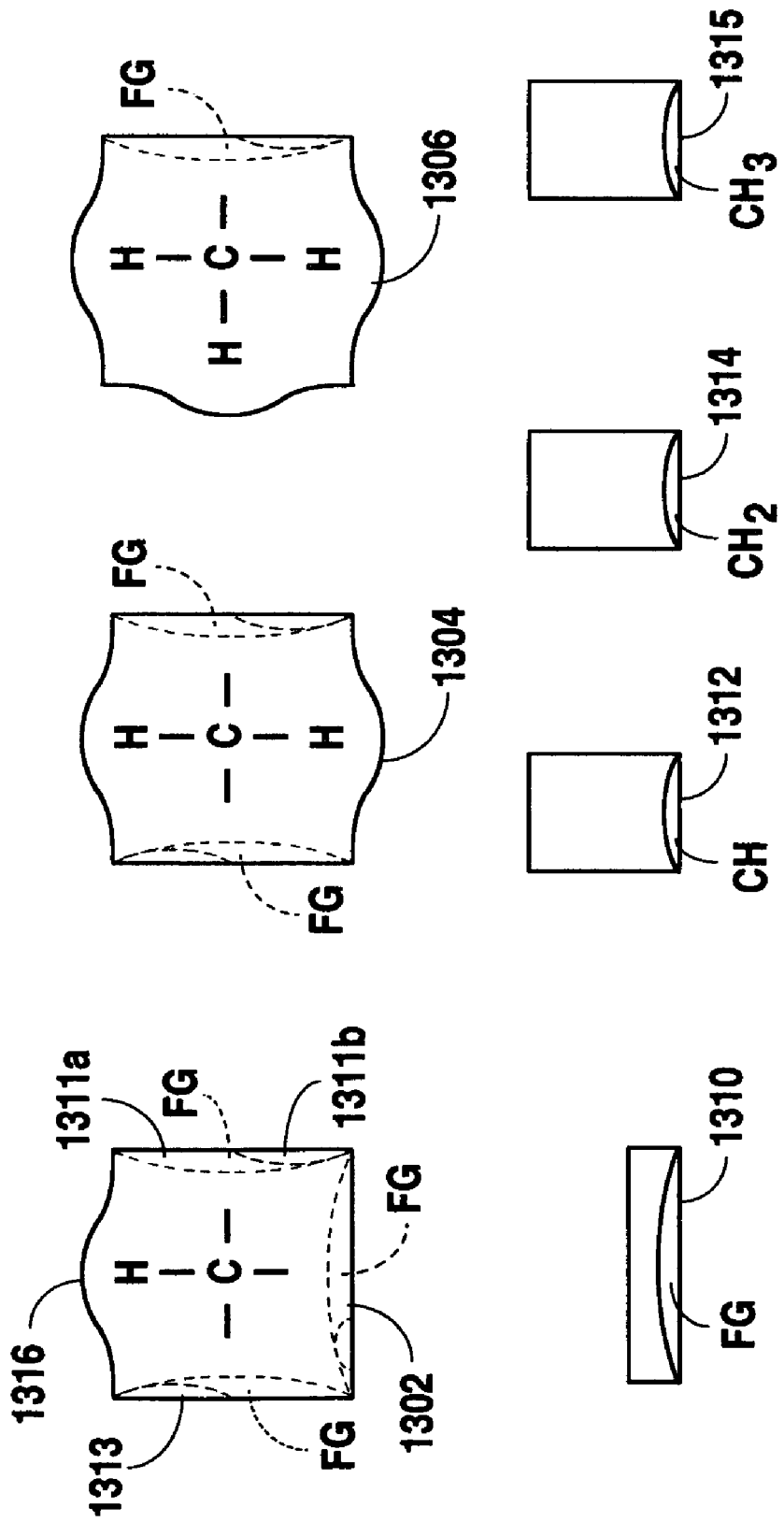
FIG. 21 is a top view of select pieces of the second embodiment of the present invention with interchangeable bonding indicators.

FIG. 21 is a top view of select pieces of the second embodiment of the present invention with interchangeable bonding indicators. Piece 1302 represents a methine piece. The methine piece 1302 has three bonding sides 1313 and one curved hydrogen side 1316. The piece has indicia thereon for identification. The three bonding sides 1313 have combined bonding indicators 1311 which incorporate an outline for a first bonding indicator 1311a and an outline for a second bonding indicator 1311b. The outline for the first bonding indicator 1311a is preferably semi-elliptical and is utilized to indicate the location where the first bonding indicator 1310 will be superimposed. While the outline for the first bonding indicators 1311a are preferably semi-elliptical any shape is possible as long as it is a shape that matches the corresponding first bonding indicator 1310.

The outline for the second bonding indicator 1311b is preferably hemispherical and is used to indicate bonding to an atom or group that does cause observable splitting of the NMR peak. The outline for the second bonding indicator 1311b is preferably hemispherical and is utilized to indicate the location where the second bonding indicator 1312–1315 will be superimposed. While the outline for the second bonding indicators 1311b are preferably hemispherical any shape is possible as long as it is a shape that matches the corresponding second bonding indicator 1312–1315, respectively.

Pieces 1310, 1312, 1314, and 1315 are provided to customize piece 1302 as well as pieces 1304 and 1306. First bonding indicators 1310 are provided which are formed from a piece of cling plastic material, and preferably precut therein. In addition, first bonding indicators 1310 can be placed in the outline formed for first bonding indicators 1311a. The first bonding indicators 1310 are preferably semi-elliptical and are shown with indicia "FG" to indicate bonding to an atom or group that does not cause observable splitting of the NMR peak. While the first bonding indicators 1310 are preferably semi-elliptical, any shape is possible as long as it is a shape that matches the first bonding indicator outline 1311a. The first bonding indicator 1310 is also color-coded and can be any color as long as it matches the color of the mating piece.

In addition second bonding indicators 1312, 1314 and 1315 are provided which are formed from a piece of cling plastic material, and preferably precut therein. Second bonding indicators 1312, 1314 and 1315 can be placed in the outline formed for second bonding indicators 1311b. Second bonding indicator 1312 is used to indicate bonding to a "CH" group whereas second bonding indicator 1314 is used to indicate bonding to a "CH$_2$" group. Second bonding indicator 1315 is used to indicate bonding to a "CH$_3$" group. While the second bonding indicators 1312, 1314, and 1315 are preferably hemispherical, any shape is possible. The second bonding indicators 1312, 1314, and 1315 are also color-coded and can be any color as long as they match the color of the mating piece.

Piece 1304 represents a methylene piece. The methylene piece has two bonding sides 1313 and two curved hydrogen sides 1316. The piece has indicia thereon for identification. The two bonding sides 1313 have combined bonding indicators 1311 which incorporate an outline for a first bonding indicator 1311a and an outline for a second bonding indicator 1311b. The outline for the first bonding indicator 1311a is preferably semi-elliptical and is utilized to indicate the location where the first bonding indicator 1310 will be superimposed. While the outline for the first bonding indicators 1311a are preferably semi-elliptical any shape is possible as long as it is a shape that matches the corresponding first bonding indicator 1310.

The outline for the second bonding indicator 1311b is preferably hemispherical and is used to indicate bonding to an atom or group that does cause observable splitting of the NMR peak. The outline for the second bonding indicator 1311b is preferably hemispherical and is utilized to indicate the location where the second bonding indicator 1312–1315 will be superimposed. While the outline for the second bonding indicators 1311b are preferably hemispherical any shape is possible as long as it is a shape that matches the corresponding second bonding indicator 1312–1315, respectively.

Piece 1306 represents a methyl piece. The methyl piece has one bonding side 1313 and three curved hydrogen sides 1316. The piece has indicia thereon for identification. The bonding side 1313 has combined bonding indicators 1311 which incorporate an outline for a first bonding indicator 1311a and an outline for a second bonding indicator 1311b. The outline for the first bonding indicator 1311a is preferably semi-elliptical and is utilized to indicate the location where the first bonding indicator 1310 will be superimposed. While the outline for the first bonding indicators 1311a are preferably semi-elliptical any shape is possible as long as it is a shape that matches the corresponding first bonding indicator 1310.

The outline for the second bonding indicator 1311b is preferably hemispherical and is used to indicate bonding to an atom or group that does cause observable splitting of the NMR peak. The outline for the second bonding indicator 1311b is preferably hemispherical and is utilized to indicate the location where the second bonding indicator 1312–1315 will be superimposed. While the outline for the second bonding indicators 1311b are preferably hemispherical any shape is possible as long as it is a shape that matches the corresponding second bonding indicator 1312–1315, respectively.

When a student utilizes the pieces represented in FIG. 21 to determine the structure of a molecule from an NMR spectrum, he or she will first use integration (and molecular formula if available) to determine the number of hydrogens contributing to the peak. Once this is determined, the student can choose the base piece, such as 1302, 1304, or 1306, having both first and second bonding indicator outlines 1311a and 1311b. Next, the student will determine the peak multiplicity (splitting) to determine the number of hydrogen(s) on neighbor group(s). Once this is determined, the student can choose the necessary second bonding indicator piece(s), such as 1312, 1314 or 1315. Last, the student will use the chemical shift present in the spectrum to determine whether the base piece is also adjacent to a functional group. Once this is determined, the student can choose the necessary first bonding indicator piece(s), such as 1310.

For example, consider that the student is given the 1H NMR spectrum for the unknown molecule $C_2H_5Br$ (as shown in Example 1 supra). The peak integration is 2:3. The peak at 3.4 δ is a $CH_2$ (from chemical shift and integration); therefore, the student should pull the base piece that corresponds in color and indicia to the $CH_2$, i.e. 1304. This $CH_2$ piece 1304 is also next to an electronegative atom Br due to the chemical shift. This indicates the student should place a first bonding indicator 1310 within the existing outline 1311a to complete this portion of piece 1304. A functional group piece should be pulled to represent the Br, such as piece 422.

The peak at 3.4 δ is also a quartet that indicates there are three adjacent neighbor hydrogens. This indicates that the student will place a second bonding indicator color coded for $CH_3$, i.e. 1315, within existing outline 1311b to complete this portion of piece 1304.

The peak at 1.7 δ is a $CH_3$ (from chemical shift and integration) which indicates the student should choose a base piece that corresponds in color and indicia to the $CH_3$, i.e. 1306. In addition, the triplet indicates an adjacent two hydrogens. The student will place a second bonding indicator color coded for $CH_2$, i.e. 1314, within outline 1311b to complete this portion of piece 1306.

Once the student has chosen each of the necessary pieces, the student will fit the pieces together to form the molecule. It is important that the colors of the bonding indicators on the base pieces 1304 and 1306 match the colors of the mating pieces. When the two completed base pieces and the functional group piece are arranged, the $CH_3$ bonding indicator 1315 on the $CH_2$ base piece 1304 will match in color with the $CH_3$ base piece 1306. In addition, the $CH_2$ bonding indicator 1314 on the $CH_3$ base piece 1306 will match in color with the $CH_2$ base piece 1304. This indicates the two base pieces 1304 and 1306 should be matched together. In addition, the Br first bonding indicator 1310 on the $CH_2$ base piece 1304 will match in color with the Br functional group piece 422, thus indicating the two should be matched together. The remaining two sides of the $CH_2$ base piece 1304 are nonbonding and therefore require no additional groups.

The use of combined bonding indicators along with color-coding these bonding indicators as described in FIG. 21 is not to be construed as limited to those chemical groups described, but can be applied to each of the groups described in the preferred and second embodiments as well as those groups obvious to individuals skilled in the art.

In accordance with the principles of the present invention, the functionality disclosed herein cannot only be implemented manually, but can be implemented by hardware, software, and/or a combination of both. Software implementations can be written in any suitable language or a combination of languages where applicable, including fourth generation languages defined as programming languages closer to human languages than typical high level (third generation) programming languages. Most fourth generation languages are used to access databases. The software implementation can also be written in a third generation languages such as, but not limited to, Ada, Algol, BASIC, COBOL, C, C++, FORTRAN, LISP, Pascal, and Prolog. These third generation languages are known as high level programming languages and are defined as enabling a programmer to write programs that are more or less independent of a particular type of computer. These languages are considered high-level because they are closer to human languages and further from machine languages.

The software used in the invention can also be written in a second generation language or assembly language. Assembly language is a programming language once removed from a computer's machine language. This language has the same structure and set of commands as machine languages, but enables a programmer to use names instead of numbers.

It is rare, but possible that the present software will incorporate first generation language or machine language. Machine language is the only language understood by computers. While easily understood by computers, machine languages are almost impossible for humans to use because they consist entirely of numbers. Programs written in high-level languages are translated into assembly language or machine language with a compiler or interpreter. Assembly language programs are translated into machine language with an assembler program.

The system running such a software program would have a standard computer subsystem, such as the IBM personal computer (also known as the IBM PC), including a CPU (e.g. a microcomputer system, including a central processing unit, disk drive, etc.), a display device (such as a standard CRT monitor or television monitor), an input device (such as a keyboard or mouse), an application specific piece of hardware, or other suitable device. It is preferred that the computer subsystem incorporate a graphical user interface operating system such as, but not limited to, Mac OS/System, UNIX or Windows. Additional functions that are preferred, but not required from the operating system include multi-user capability, multiprocessing, multitasking, and multithreading.

In addition to using discrete hardware components in a logic circuit, the required logic may also be performed by an application specific integrated circuit ("ASIC"), a programmed programmable logic device ("PLD"), or other device. The system will also include various hardware components which are well known in the art, such as connectors, cables, and the like. Moreover, at least part of this functionality may be embodied in computer readable media (also referred to as computer program products), such as magnetic, magnetic-optical, and optical media, used in programming an information-processing apparatus to perform in accordance with the invention. This functionality also may be embodied in computer readable media, or computer program products, such as a transmitted waveform to be used in transmitting the information or functionality.

The software/hardware program of the present invention can include a student tutorial application and/or a laboratory identification application. In both applications, a series of user interface screens will be displayed. These screens illustrate what the user sees when participating in the student tutorial application or laboratory identification application respectively. It will of course be understood that the application of the present invention to a software or hardware program is not restricted to the particular user interfaces illustrated. Rather, any suitable user interface can be employed.

The student tutorial application will be discussed first. In the student tutorial application, the initial configuration screen will appear which includes a plurality of check boxes or the like through which the student user can select which application functions he or she wishes to explore. These check boxes are selected and deselected by selective mouse clicks. The actual items listed on the configuration screen correspond to application functions specific to the program, such as, but not limited to skill level, molecule type, and random sort.

After the student user has selected the desired functions, the OK button on the screen is clicked, whereupon the chosen testing sequence begins. The testing sequence begins in the next window, the selection screen, which provides an NMR spectrum. The student user is then prompted at the selection screen to select atoms or groups from the screen to begin the identification. These atoms and groups are labeled on descriptive buttons provided on the screen. These atom and group buttons are selected and deselected by selective mouse clicks. Upon each selection of the atom or group, the respective atom or group appears on the screen as a larger and moveable component on the screen.

When the student user has selected all atoms and/or groups he or she believes are applicable, the OK button on the screen is clicked. The student user is then prompted in the arrangement screen to select between buttons that display such functions as auto-arrange and manual arrange. These buttons are selected by mouse clicks. Upon selection of auto-arrange, the selected atom and/or group pieces are automatically arranged on the computer screen to provide the best fit or a series of applicable fits between the chosen atom and/or group pieces. Selection of manual arrange simply allows the student user to move the atom and/or group pieces on the screen himself to obtain a perfect fit. If a perfect fit cannot be found, the student user will be prompted to return to the selection screen to try again, to try another molecule, or to see the answer.

If a perfect fit is found between the chosen atom and/or group pieces, an exclamation on the screen will appear such as, but not limited to, "Perfect Fit". If a perfect fit is found, the student user is then prompted by an open box to write the name of the unknown molecule. If the name keyed into the open box by the student user is the identity of the unknown molecule, an exclamation will appear on the screen, such as, but not limited to, "Congratulations, you've identified the unknown molecule". The student user can then be prompted to select between buttons that display functions such as, but not limited to, "Try Another", "View 3D", and "View MSDS". These buttons are selected by mouse clicks.

If the name keyed into the open box by the student user is not the identity of the unknown molecule, an exclamation will appear on the screen such as, but not limited to, "Oops, try again". The student user will then be returned to the selection screen and prompted to select between buttons that allow the student user to decide whether to change the existing selection or start a new selection of atoms and/or groups. The buttons are selected by mouse clicks. Once the student user has entered the new atoms and/or groups, again the student user can choose to auto arrange the pieces in the arrangement screen and determine if a perfect fit exists. The student user can again type in the applicable name to determine if he or she has correctly identified the molecule.

The application can be preconfigured at the configuration screen to repeat continuously until the right answer is obtained or to repeat for only a pre-designated number of times before the student user is prompted with the correct identification and atom and/or group arrangement of the unknown molecule. With each wrong name entered, the student user will be prompted to select between buttons that display functions such as, but not limited to, "Try Another" and "See Answer". These buttons can be selected by mouse clicks.

The laboratory identification application can exist independently, with the student tutorial application or associated with the computer system of an NMR instrument in a laboratory. In the laboratory identification application, an initial configuration screen will appear which includes a plurality of checkboxes or the like through which the laboratory user can select which application functions he or she wishes to explore. The check boxes are selected and deselected by selective mouse clicks. The actual items listed on the configuration screen correspond to application functions specific to the program, such as, but not limited to scan spectrum, run spectrum and enter peaks.

After the laboratory user has selected the desired functions, the OK button is clicked on the screen, whereupon the chosen function begins. The scan spectrum function begins in the next window that shows the NMR spectrum image being scanned onto the screen from a paper copy. The spectrum could also be transferred directly from the spectrometer acquisition program. The laboratory user is then prompted with various formatting functions such as clarifying the image. Once the desired image is obtained from the formatting, the laboratory user can then select a button on the screen such as "Accept Image".

Once the laboratory user has accepted the NMR spectrum image from the paper scan, the laboratory user is then prompted at a selection screen to select atoms and/or groups from the screen to begin identification. These atoms and groups are labeled as descriptive buttons provided on the screen. These atom and group buttons are selected and deselected by selective mouse clicks. Upon each selection of the atom or group, the respective atom or group appears on the screen as a larger and moveable component on the screen.

When the laboratory user has selected all atoms and/or groups he or she believes are applicable, the OK button on the screen is clicked. The laboratory user is then prompted in the arrangement screen to select between buttons that display such functions as auto arrange and manual arrange. These buttons are selected by mouse clicks. Upon selection of auto-arrange, the selected atom and/or group pieces are automatically arranged on the computer screen to provide the best fit or series of applicable fits between the chosen atom and/or group pieces. Selection of manual arrange simply allows the laboratory user to move the atom and/or group pieces on the screen himself to obtain a perfect fit. If a perfect fit cannot be found, the laboratory user will be prompted to return to the selection screen to try again or to access the built in NMR spectrum database to obtain the identity of the molecule or a series of possible identities by randomly choosing suspected possibilities.

If a perfect fit is found between the chosen chemical fragment pieces, an exclamation on the screen will appear such as, but not limited to, "Perfect Fit". If a perfect fit is found, the laboratory user is then prompted by an open box to write the name of the unknown molecule. A button is also provided on the screen that upon selection by the laboratory user allows the program to automatically provide a name for the unknown molecule or a list of possibilities. Once the name is entered by either means, the program will then search within the built in NMR spectrum database to determine if a spectrum for the suspected molecule is contained therein. If one exists, the NMR spectrum will be displayed on the screen in the same window as the scanned NMR spectrum image so the laboratory user or the program can perform a comparison of the spectra. The laboratory user can then be prompted to select between buttons that display functions such as, but not limited to, "Scan Another", "View 3D", and "View MSDS". These buttons are selected by mouse clicks.

If the laboratory user is not satisfied with the search results, the laboratory user can select from buttons on the screen that prompt the laboratory user to return to the selection screen to try again with a new selection of atoms and/or groups or to access the built in NMR spectrum database to obtain the identity of the molecule or a series of possible identities by randomly choosing suspected possibilities. Alternatively, the program may search the database to find similar spectra by matching the peaks. This is common in commercial infrared and mass spectrometer instruments. The laboratory user can also return to the open box and type in names similar to the suspected name of the unknown molecule.

If the laboratory user decides to try again at the selection screen, the laboratory user will again enter possible atoms and/or groups. Once the laboratory user has entered the new atoms and/or groups, again the laboratory user can choose to auto arrange the pieces in the arrangement screen and determine if a perfect fit exists. The laboratory user can again type in the applicable name to access an NMR spectrum from the built in NMR spectrum database.

When a laboratory user selects the run spectrum function, the application launches into the applicable software program provided with the NMR instrument from the manufacturer and/or supplier of NMR spectrometers. Since the laboratory user will be interfaced into this second software program, the screens that appear from this point in this second software program are the proprietary materials of those respective companies.

When a laboratory user selects the enter peaks function button, this function is launched onto the screen prompting the laboratory user to enter the chemical shift for peaks on the NMR spectrum, integration if known, and the splitting. Once the laboratory user has entered the peak information, a cursory NMR spectrum will appear on the screen. The laboratory user is prompted with buttons to select whether this NMR spectrum is correct. The buttons are selected by mouse clicks.

Once the laboratory user has approved the NMR spectrum on the screen, the laboratory user is then prompted at a selection screen to select atoms and/or groups from the screen to begin identification. These atoms and groups are labeled as descriptive buttons provided on the screen. These atom and group buttons are selected and deselected by selective mouse clicks. Upon each selection of the atom or group, the respective atom or group appears on the screen as a larger and moveable component on the screen.

When the laboratory user has selected all atoms and/or groups he or she believes are applicable, the OK button on the screen is clicked. The laboratory user is then prompted in the arrangement screen to select between buttons that display such functions as auto arrange and manual arrange. These buttons are selected by mouse clicks. Upon selection of auto-arrange, the selected atom and/or group pieces are automatically arranged on the computer screen to provide the best fit or series of applicable fits between the chosen atom and/or group pieces. Selection of manual arrange simply allows the laboratory user to move the atom and/or group pieces on the screen himself to obtain a perfect fit. If a perfect fit cannot be found, the laboratory user will be prompted to return to the selection screen to try again or to access the built in NMR spectrum database to obtain the identity of the molecule or series of possible identities by randomly choosing suspected possibilities.

If a perfect fit is found between the chosen atom and/or group pieces, an exclamation on the screen will appear such as, but not limited to, "Perfect Fit". If a perfect fit is found, the laboratory user is then prompted by an open box to write the name of the unknown molecule. A button is also provided on the screen that upon selection by the laboratory user allows the program to automatically provide a name for the unknown molecule or a list of possibilities. Once the name is entered by either means, the program will then search within the built in NMR spectrum database to determine if a spectrum for the suspected molecule is contained therein. If one exists, the NMR spectrum will be displayed on the screen in the same window as the cursory image so the laboratory user or the program can perform a comparison of the spectra. The laboratory user can then be prompted to select between buttons that display functions such as, but not limited to, "Enter Another", "View 3D", and "View MSDS". These buttons are selected by mouse clicks.

If the laboratory user is not satisfied with the search results, the laboratory user can select from buttons on the screen that prompt the laboratory user to return to the selection screen to try again with a new selection of atoms and/or groups or to access the built in NMR spectrum database to obtain the identity of the molecule or a series of possible identities by randomly choosing suspected possibilities. The laboratory user can also return to the open box and type in names similar to the suspected name of the unknown molecule.

If the laboratory user decides to try again at the selection screen, the laboratory user will again enter possible atoms and/or groups. Once the laboratory user has entered the new atoms and/or groups, again the laboratory user can choose to auto arrange the pieces in the arrangement screen and determine if a perfect fit exists. The laboratory user can again type in the applicable name to access an NMR spectrum from the built in NMR spectrum database.

If the name is not found in the NMR spectrum database, the user will be notified and any final structural identification will be limited to the identification found during the "Perfect Fit".

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. Accordingly it is intended to embrace all such alternatives, modifications and variations as fall within the spirit and broad scope of the invention. It is, therefore, contemplated that the appended claims will cover such modifications that fall within the scope of the invention.

The invention claimed is:

1. A teaching method for training students in molecule identification from nuclear magnetic resonance spectra comprising the steps of:
   providing said spectra to said students;
   identifying chemical fragments from said chemical shift on said spectra;
   determining the number of hydrogens which each peak on said spectra represents from integration;
   accessing the splitting pattern on said spectra caused by neighboring hydrogens;
   providing a plurality of individual, two-dimensional, chemical fragment-defining cutouts representing a range of chemical fragments having corresponding distinctive configurations in which each of said cutouts is of a predetermined size relative to that of the other cutouts;
   selecting cutouts representative of said chemical fragments identified from said spectra; and
   arranging said selected cutouts to determine the identity of said molecule.

2. The teaching method for training students in molecule identification from nuclear magnetic resonance spectra of claim 1 wherein said cutouts have a number of sides corresponding to the number of bonds present around the central atom of said chemical fragment represented by said cutout.

3. The teaching method for training students in molecule identification from nuclear magnetic resonance spectra of claim 2 wherein said cutouts have flat sides indicative of bonding sides and curved sides indicative of hydrogen bonding sides.

4. The teaching method for training students in molecule identification from nuclear magnetic resonance spectra of claim 3 wherein said cutouts have concavities and convex tabs on said bonding sides when said cutout is to be mated with another said cutout representing a chemical fragment that causes observable splitting of the peak of said nuclear magnetic resonance spectra.

5. The teaching method for training students in molecule identification from nuclear magnetic resonance spectra of claim 4 wherein said concavities are indicative of the chemical fragment represented by said cutout.

6. The teaching method for training students in molecule identification from nuclear magnetic resonance spectra of claim 4 wherein said convex tabs are indicative of the chemical fragment represented by a mating cutout.

7. The teaching method for training students in molecule identification from nuclear magnetic resonance spectra of claim 4 wherein said shape of said convex tabs on said cutouts is indicative of the number of hydrogen atoms in the chemical fragment of said mating cutouts.

8. The teaching method for training students in molecule identification from nuclear magnetic resonance spectra of claim 4 wherein said shape of said concavities on said cutouts is indicative of the number of hydrogen atoms in the chemical fragment of said cutout.

9. The teaching method for training students in molecule identification from nuclear magnetic resonance spectra of claim 3 wherein said cutouts have a first bonding indicator represented on said bonding sides when said cutout is to be mated with another said cutout representing a chemical fragment that does not cause observable splitting of the peak of said nuclear magnetic resonance spectra.

10. The teaching method for training students in molecule identification from nuclear magnetic resonance spectra of claim 9 wherein said cutouts have a second bonding indicator represented on said bonding sides when said cutout is to be mated with another said cutout representing a chemical fragment that causes observable splitting of the peak of said nuclear magnetic resonance spectra.

11. A teaching method for training students in molecule identification from nuclear magnetic resonance spectra comprising the steps of:
   providing said spectra to said students;
   identifying chemical fragments from said chemical shift on said spectra;
   determining the number of hydrogens which each peak on said spectra represents from integration;
   accessing the splitting pattern on said spectra caused by neighboring hydrogens;
   providing a plurality of individual, two-dimensional, chemical fragment-defining cutouts representing a range of chemical fragments having corresponding distinctive configurations in which each of said cutouts is of a predetermined size relative to that of the other cutouts;
   selecting cutouts representative of said chemical fragments identified from said spectra; and
   arranging said selected cutouts to determine the identity of said molecule,
   wherein said cutouts have a number of sides corresponding to the number of bonds present around the central atom of said chemical fragment represented by said cutout and said cutouts have flat sides indicative of bonding sides and curved sides indicative of hydrogen bonding sides and said cutouts have a first bonding indicator represented on said bonding sides when said cutout is to be mated with another said cutout representing a chemical fragment that does not cause observable splitting of the peak of said nuclear magnetic resonance spectra, wherein said first bonding indicator is color-coded to the color of the mating cutout.

12. A teaching method for training students in molecule identification from nuclear magnetic resonance spectra comprising the steps of:
providing said spectra to said students;
identifying chemical fragments from said chemical shift on said spectra;
determining the number of hydrogens which each peak on said spectra represents from integration;
accessing the splitting pattern on said spectra caused by neighboring hydrogens;
providing a plurality of individual, two-dimensional, chemical fragment-defining cutouts representing a range of chemical fragments having corresponding distinctive configurations in which each of said cutouts is of a predetermined size relative to that of the other cutouts;
selecting cutouts representative of said chemical fragments identified from said spectra; and
arranging said selected cutouts to determine the identity of said molecule,
wherein said cutouts have a number of sides corresponding to the number of bonds present around the central atom of said chemical fragment represented by said cutout and said cutouts have flat sides indicative of bonding sides and curved sides indicative of hydrogen bonding sides and said cutouts have a first bonding indicator represented on said bonding sides when said cutout is to be mated with another said cutout representing a chemical fragment that does not cause observable splitting of the peak of said nuclear magnetic resonance spectra and said cutouts have a second bonding indicator represented on said bonding sides when said cutout is to be mated with another said cutout representing a chemical fragment that causes observable splitting of the peak of said nuclear magnetic resonance spectra wherein said first bonding indicator is color-coded to the color of the mating cutout and said second bonding indicator is color-coded to the color of the mating cutout.

13. The teaching method for training students in molecule identification from nuclear magnetic resonance spectra of claim 12 wherein said first bonding indicators have a different shape from that of said second bonding indicators.

14. A teaching method for training students in molecular identification from nuclear magnetic resonance spectra comprising the steps of:
providing said spectra to said students;
identifying chemical fragments from said chemical shift on said spectra;
determining the number of hydrogens which each peak on said spectra represents from integration;
accessing the splitting pattern on said spectra caused by neighboring hydrogens;
providing a plurality of individual, two-dimensional, chemical fragment-defining cutouts representing a range of chemical fragments having corresponding distinctive configurations in which each of said cutouts is of a predetermined size relative to that of the other cutouts;
selecting cutouts representative of said chemical fragments identified from said spectra; and
arranging said selected cutouts to determine the identity of said molecule, wherein said cutouts have a number of sides corresponding to the number of bonds present around the central atom of said chemical fragment represented by said cutout and said cutouts have flat sides indicative of bonding sides and curved sides indicative of hydrogen bonding sides, wherein said cutouts have a first outline provided within a second outline on said bonding sides, said first outline being indicative of the placement position for a first bonding indicator and said second outline being indicative of the placement position for a second bonding indicator.

15. The teaching method for training students in molecular identification from nuclear magnetic resonance spectra of claim 14 wherein said selecting step further comprises the step of selecting said first bonding indicators or said second bonding indicators.

16. The teaching method for training students in molecular identification from nuclear magnetic resonance spectra of claim 15 further comprising the step of placing said first bonding indicator within said first outline when said cutout is to be mated with another said cutout representing a chemical fragment that does not cause observable splitting of the peak of the nuclear magnetic resonance spectra.

17. The teaching method for training students in molecular identification from nuclear magnetic resonance spectra of claim 15 further comprising the step of placing said second bonding indicator within said second outline when said cutout is to be mated with another said cutout representing a chemical fragment that causes observable splitting of the peak of the nuclear magnetic resonance spectra.

18. The teaching method for training students in molecular identification from nuclear magnetic resonance spectra of claim 16 wherein said first bonding indicator is color-coded to the color of the mating cutout.

19. The teaching method for training students in molecular identification from nuclear magnetic resonance spectra of claim 17 wherein said second bonding indicator is color-coded to the color of the mating cutout.

20. A teaching apparatus for training students in molecular identification from nuclear magnetic resonance spectra comprising:
a plurality of individual, two-dimensional, chemical fragment-defining cutouts representing a range of chemical fragments having corresponding distinctive configurations in which each of said cutouts is of a predetermined size relative to that of the other cutouts, and wherein said cutouts have a number of sides corresponding to the number of bonds present around the central atom of said chemical fragment represented by said cutout.

21. The teaching apparatus for training students in molecular identification from nuclear magnetic resonance spectra of claim 20 wherein said sides when flat are indicative of a bonding side and said sides when curved are indicative of a hydrogen bonding side.

22. The teaching apparatus for training students in molecular identification from nuclear magnetic resonance spectra of claim 21 wherein said cutouts further comprise concavities and convex tabs on said bonding sides when said cutout is to be mated with another said cutout representing a chemical fragment that causes observable splitting of the peak of said nuclear magnetic resonance spectra.

23. The teaching apparatus for training students in molecular identification from nuclear magnetic resonance spectra of claim 22 wherein said concavities are indicative of the chemical fragment represented by said cutout.

24. The teaching apparatus for training students in molecular identification from nuclear magnetic resonance spectra of claim 22 wherein said convex tabs are indicative of the chemical fragment represented by a mating cutout.

25. The teaching apparatus for training students in molecular identification from nuclear magnetic resonance spectra of claim 22 wherein the shape of said convex tabs on said cutouts is indicative of the number of hydrogen atoms in the chemical fragment of said mating cutouts.

26. The teaching apparatus for training students in molecular identification from nuclear magnetic resonance spectra of claim 22 wherein the shape of said concavities on said cutouts is indicative of the number of hydrogen atoms in the chemical fragment of said cutout.

27. The teaching apparatus for training students in molecular identification from nuclear magnetic resonance spectra of claim 21 wherein said cutouts further comprise a first bonding indicator represented on said bonding sides when said cutout is to be mated with another said cutout representing a chemical fragment that does not cause observable splitting of the peak of said nuclear magnetic resonance spectra.

28. The teaching apparatus for training students in molecular identification from nuclear magnetic resonance spectra of claim 27 wherein said cutouts further comprise a second bonding indicator represented on said bonding sides when said cutout is to be mated with another said cutout representing a chemical fragment that causes observable splitting of the peak of said nuclear magnetic resonance spectra.

29. A teaching apparatus for training students in molecular identification from nuclear resonance spectra comprising:
a plurality of individual, two-dimensional, chemical fragment-defining cutouts representing a range of chemical fragments having corresponding distinctive configurations in which each of said cutouts is of a predetermined size relative to that of the other cutouts, and wherein said cutouts have a number of sides corresponding to the number of bonds present around the central atom of said chemical fragment represented by said cutout, said sides when flat are indicative of a bonding side and said sides when curved are indicative of a hydrogen bonding side, said cutouts further comprise a first bonding indicator represented on said bonding sides when said cutout is to be mated with another said cutout representing a chemical fragment that does not cause observable splitting of the peak of said nuclear magnetic resonance spectra wherein said first bonding indicator is color-coded to the color of the mating cutout.

30. A teaching apparatus for training students in molecular identification from nuclear magnetic resonance spectra comprising:
a plurality of individual, two-dimensional, chemical fragment-defining cutouts representing a range of chemical fragments having corresponding distinctive configurations in which each of said cutouts is of a predetermined size relative to that of the other cutouts, and wherein said cutouts have a number of sides corresponding to the number of bonds present around the central atom of said chemical fragment represented by said cutout, said sides when flat are indicative of a bonding side and said sides when curved are indicative of a hydrogen bonding side, said cutouts further comprise a first bonding indicator represented on said bonding sides when said cutout is to be mated with another said cutout representing a chemical fragment that does not cause observable splitting of the peak of said nuclear magnetic resonance spectra and a second bonding indicator represented on said bonding sides when said cutout is to be mated with another said cutout representing a chemical fragment that causes observable splitting of the peak of said nuclear magnetic resonance spectra, wherein said second bonding indicator is color-coded to the color of the mating cutout.

31. A teaching apparatus for training students in molecular identification from nuclear magnetic resonance spectra comprising:
a plurality of individual, two-dimensional, chemical fragment-defining cutouts representing a range of chemical fragments having corresponding distinctive configurations in which each of said cutouts is of a predetermined size relative to that of the other cutouts, and wherein said cutouts have a number of sides corresponding to the number of bonds present around the central atom of said chemical fragment represented by said cutout, said sides when flat are indicative of a bonding side and said sides when curved are indicative of a hydrogen bonding side wherein said cutouts have a first outline provided within a second outline on said bonding sides, said first outline being indicative of the placement position for a first bonding indicator and said second outline being indicative of the placement position for a second bonding indicator.

32. The teaching apparatus for training students in molecular identification from nuclear magnetic resonance spectra of claim 31 wherein said shape of said first outline is the same as the shape of said first bonding indicator.

33. The teaching apparatus for training students in molecular identification from nuclear magnetic resonance spectra of claim 31 wherein said shape of said second outline is the same as the shape of said second bonding indicator.

34. The teaching apparatus for training students in molecular identification from nuclear magnetic resonance spectra of claim 31 wherein said first bonding indicator is applied to said first outline when said cutout is to be mated with another said cutout representing a chemical fragment that does not cause observable splitting of the peak of the nuclear magnetic resonance spectra.

35. The teaching apparatus for training students in molecular identification from nuclear magnetic resonance spectra of claim 31 wherein said second bonding indicator is applied to said second outline when said cutout is to be mated with another said cutout representing a chemical fragment that causes observable splitting of the peak of the nuclear magnetic resonance spectra.

36. The teaching apparatus for training students in molecular identification from nuclear magnetic resonance spectra of claim 34 wherein said first bonding indicator is color-coded to the color of the mating cutout.

37. The teaching apparatus for training students in molecular identification from nuclear magnetic resonance spectra of claim 35 wherein said second bonding indicator is color-coded to the color of the mating cutout.

38. A teaching method for training students in molecule identification from nuclear magnetic resonance spectra comprising the steps of:
providing said spectra to said students;
identifying chemical fragments from said chemical shift on said spectra;
determining the number of hydrogens which each peak on said spectra represents from integration;
accessing the splitting pattern on said spectra caused by neighboring hydrogens;

providing a plurality of individual chemical fragment-defining cutouts representing a range of chemical fragments having corresponding distinctive configurations in which each of said cutouts is of a predetermined size relative to that of the other cutouts;

selecting cutouts representative of said chemical fragments identified from said spectra, wherein said cutouts have a number of sides corresponding to the number of bonds present around the central atom of said chemical fragment represented by said cutout and wherein said cutouts have flat sides indicative of bonding sides and curved sides indicative of hydrogen bonding sides and wherein said cutouts have a first bonding indicator represented on said bonding sides when said cutout is to be mated with another said cutout representing a chemical fragment that does not cause observable splitting of the peak of said nuclear magnetic resonance spectra, said first bonding indicator being color-coded to the color of the mating cutout; and arranging said selected cutouts to determine the identity of said molecule.

39. The teaching method for training students in molecule identification from nuclear magnetic resonance spectra of claim 38 wherein said cutouts have a second bonding indicator represented on said bonding sides when said cutout is to be mated with another said cutout representing a chemical fragment that causes observable splitting of the peak of said nuclear magnetic resonance spectra.

40. The teaching method for training students in molecule identification from nuclear magnetic resonance spectra of claim 39 wherein said second bonding indicator is color-coded to the color of the mating cutout.

41. The teaching method for training students in molecule identification from nuclear magnetic resonance spectra of claim 40 wherein said first bonding indicators have a different shape from that of said second bonding indicators.

42. The teaching method for training students in molecular identification from nuclear magnetic resonance spectra of claim 39 wherein said cutouts have a first outline provided within a second outline on said bonding sides, said first outline being indicative of the placement position for a first bonding indicator and said second outline being indicative of the placement position for a second bonding indicator.

43. The teaching method for training students in molecular identification from nuclear magnetic resonance spectra of claim 42 wherein said selecting step further comprises the step of selecting said first bonding indicators or said second bonding indicators.

44. The teaching method for training students in molecular identification from nuclear magnetic resonance spectra of claim 43 further comprising the step of placing said first bonding indicator within said first outline when said cutout is to be mated with another said cutout representing a chemical fragment that does not cause observable splitting of the peak of the nuclear magnetic resonance spectra.

45. The teaching method for training students in molecular identification from nuclear magnetic resonance spectra of claim 43 further comprising the step of placing said second bonding indicator within said second outline when said cutout is to be mated with another said cutout representing a chemical fragment that causes observable splitting of the peak of the nuclear magnetic resonance spectra.

46. A teaching apparatus for training students in molecular identification from nuclear magnetic resonance spectra comprising:

a plurality of individual chemical fragment-defining cutouts representing a range of chemical fragments having corresponding distinctive configurations in which each of said cutouts is of a predetermined size relative to that of the other cutouts, and wherein said cutouts have a number of sides corresponding to the number of bonds present around the central atom of said chemical fragment represented by said cutout, wherein said sides when flat are indicative of a bonding side and said sides when curved are indicative of a hydrogen bonding side, and wherein said cutouts further comprise a first bonding indicator represented on said bonding sides when said cutout is to be mated with another said cutout representing a chemical fragment that does not cause observable splitting of the peak of said nuclear magnetic resonance spectra, said first bonding indicator being color-coded to the color of the mating cutout.

47. The teaching apparatus for training students in molecular identification from nuclear magnetic resonance spectra of claim 46 wherein said cutouts further comprise a second bonding indicator represented on said bonding sides when said cutout is to be mated with another said cutout representing a chemical fragment that causes observable splitting of the peak of said nuclear magnetic resonance spectra.

48. The teaching apparatus for training students in molecular identification from nuclear magnetic resonance spectra of claim 47 wherein said second bonding indicator is color-coded to the color of the mating cutout.

49. The teaching apparatus for training students in molecular identification from nuclear magnetic resonance spectra of claim 47 wherein said cutouts have a first outline provided within a second outline on said bonding sides, said first outline being indicative of the placement position for a first bonding indicator and said second outline being indicative of the placement position for a second bonding indicator.

50. The teaching apparatus for training students in molecular identification from nuclear magnetic resonance spectra of claim 49 wherein said shape of said first outline is the same as the shape of said first bonding indicator.

51. The teaching apparatus for training students in molecular identification from nuclear magnetic resonance spectra of claim 49 wherein said shape of said second outline is the same as the shape of said second bonding indicator.

52. The teaching apparatus for training students in molecular identification from nuclear magnetic resonance spectra of claim 49 wherein said first bonding indicator is applied to said first outline when said cutout is to be mated with another said cutout representing a chemical fragment that does not cause observable splitting of the peak of the nuclear magnetic resonance spectra.

53. The teaching apparatus for training students in molecular identification from nuclear magnetic resonance spectra of claim 49 wherein said second bonding indicator is applied to said second outline when said cutout is to be mated with another said cutout representing a chemical fragment that causes observable splitting of the peak of the nuclear magnetic resonance spectra.

* * * * *